(12) United States Patent
Nagase

(10) Patent No.: US 8,102,574 B2
(45) Date of Patent: Jan. 24, 2012

(54) IMAGE READING DEVICE AND IMAGE FORMING DEVICE

(75) Inventor: Masaki Nagase, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 996 days.

(21) Appl. No.: 12/041,196

(22) Filed: Mar. 3, 2008

(65) Prior Publication Data

US 2008/0231918 A1 Sep. 25, 2008

(30) Foreign Application Priority Data

Mar. 19, 2007 (JP) ................................ 2007-071430

(51) Int. Cl.
*H04N 1/40* (2006.01)
*H04N 1/04* (2006.01)

(52) U.S. Cl. ........ 358/445; 358/446; 358/461; 358/474; 358/443

(58) Field of Classification Search .................. 358/445, 358/446, 497, 474, 483, 482; 348/222.1, 348/E5.069, E5.07, E5.071; 250/208.1, 234–236
See application file for complete search history.

(56) References Cited

U.S. PATENT DOCUMENTS

2008/0297616 A1 * 12/2008 Nagase et al. ............. 348/222.1

FOREIGN PATENT DOCUMENTS

| JP | 3778402 | 3/2006 |
| JP | 2006-211042 | 8/2006 |
| JP | 3935405 | 3/2007 |

* cited by examiner

*Primary Examiner* — Cheukfan Lee
(74) *Attorney, Agent, or Firm* — Oblon, Spivak, McClelland, Maier & Neustadt, L.L.P

(57) ABSTRACT

An image reading device includes a processing circuit having a clamp unit that matches an offset potential of an inputted analog image signal to a predetermined value, a processing unit that subjects an analog image signal obtained from the clamp unit to analog processing, and a converting unit that converts a processed analog image signal to a digital image signal. A control unit for controlling the processing circuit includes a switching unit that switches a main scanning line period of a charge coupled device and outputs analog image signals using a number of reading speeds, and a changing unit that changes a clamp period depending on the main scanning line period.

19 Claims, 16 Drawing Sheets

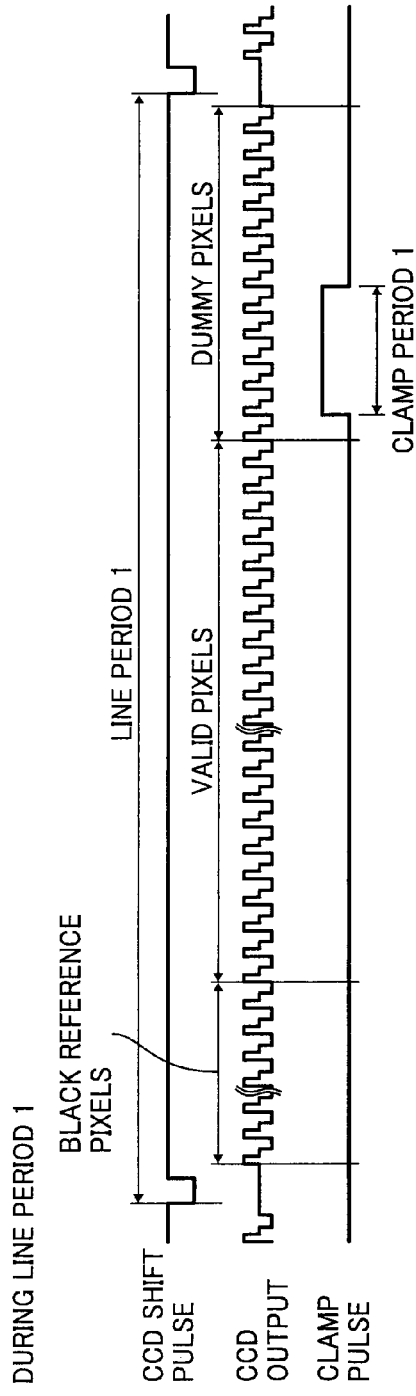
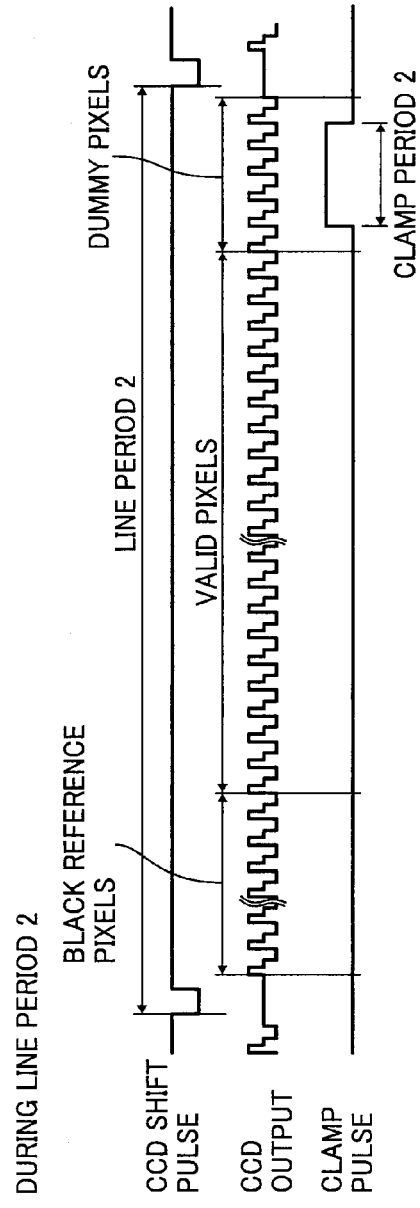

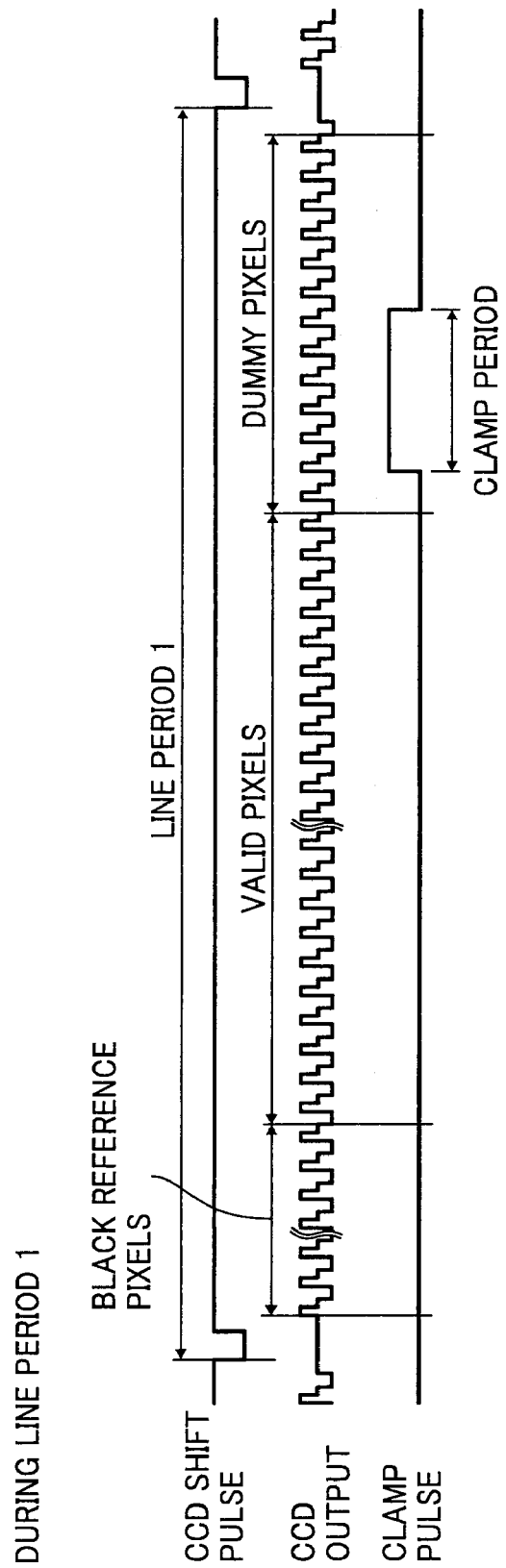

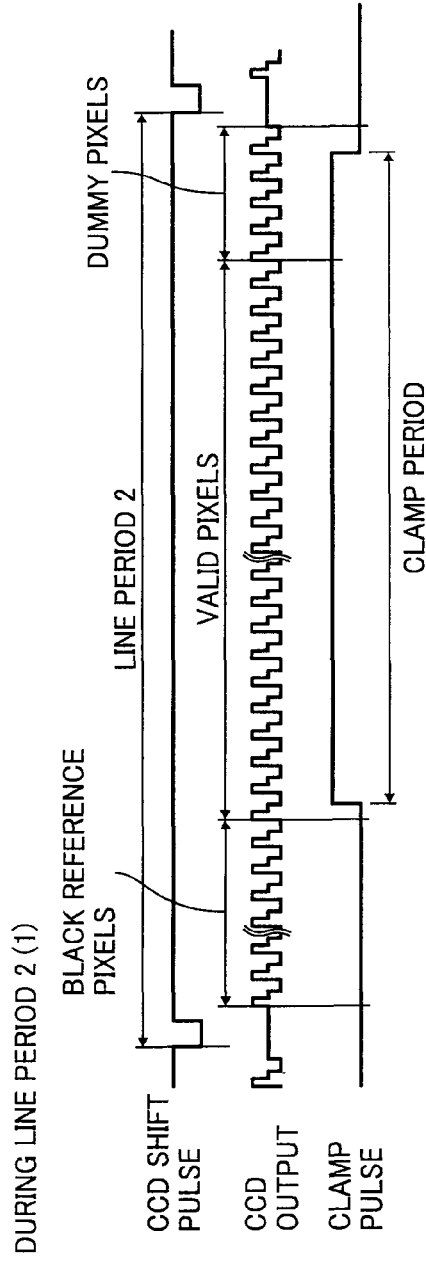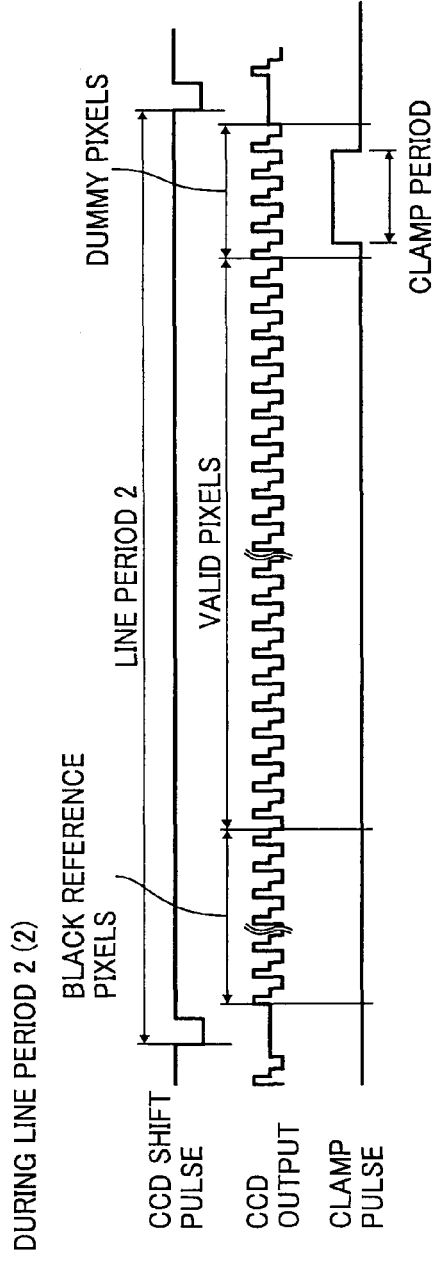

IMAGE READING DEVICE AND IMAGE FORMING DEVICE

CROSS-REFERENCE TO RELATED APPLICATIONS

The present application claims priority to and incorporates by reference the entire contents of Japanese priority document 2007-071430 filed in Japan on Mar. 19, 2007.

BACKGROUND OF THE INVENTION

1. Field of the Invention

The present invention relates to an image reading device and an image forming device.

2. Description of the Related Art

An image reading device such as a scanner is a device that reads images for an original document as an analog image signal using a photoelectric converter, converts the analog signal to a digital signal, and outputs image data subjected to various processing. FIG. 14 is a schematic cross-sectional view of a typical image reading device.

The image reading device includes an exposure glass 2 on an upper surface of a scanner body 1 on which an original document 11 is placed. An optical scanning system including a first carriage 4 of a xenon lamp 3 that is an exposing unit that exposes original documents to light and a first reflecting mirror 4a, a second carriage 5 of a second reflecting mirror 5a, and a third reflecting mirror 5b, and a lens unit 6, is then provided within the scanner body 1 below the exposure glass 2.

The image reading device further includes a charge coupled device (CCD) linear image sensor (hereinafter, "CCD") 8 that is a photoelectric converting unit mounted on a sensor board 7, and a signal processing unit 10 that processes read-in image signals inputted via a signal cable 9. A white reference plate 12 that corrects various distortion is also mounted on the front side of the exposure glass 2 at the upper surface of the scanner body 1.

When an original document is read by the image reading device, the first carriage 4 and the second carriage 5 of the optical scanning system are driven by a stepping motor so as to be moved in the direction of an arrow A of FIG. 1 in a sub scanning direction. The speed of movement of the second carriage 5 is ½ of the speed of movement of the first carriage 4. During the movement, the lower surface (image surface) of the original document 11 mounted on the exposure glass 2 is exposed to light by the xenon lamp 3 of the first carriage 4.

Light reflected by the lower surface of the original document 11 is then sequentially reflected and deflected by the first reflecting mirror 4a of the first carriage 4, and the second reflecting mirror 5a and the third reflecting mirror 5b of the second carriage 5 so as to be led to the lens unit 6. An image of the original document 11 is then reduced and formed on a light-receiving surface of the CCD 8 by the lens unit 6. The CCD 8 converts the image into an electrical signal in accordance with the light and shade (due to the intensity of the reflected light) of one line at a time using the period of the main scanning line period. An analog image signal is then outputted and is inputted from the sensor board 7 to the signal processing unit 10 via the signal cable 9.

Such the signal processing unit 10 of an image reading device of the conventional technology has been disclosed in Japanese Patent Application Laid-Open No. 2006-211042. As shown in FIG. 15, the signal processing unit 10 includes an analog signal processing unit 16 having a clamp circuit 17, a sample-hold circuit 18, an amplifier circuit 19, a multiplexer 20, an amplifier circuit 21, and an analog-to-digital (A/D) converter circuit 22, a latter stage shading correction circuit 23, a γ-correction circuit 24 and an interface (I/F) circuit 25. The signal processing unit 10 further includes an oscillator (OSC) 26 and a timing signal generating circuit 27 that controls operation timing of each part (circuit).

Control signal lines from the timing signal generating circuit 27 to each circuit section are indicated by solid-line arrows in FIG. 15. A control line for a microcomputer (abbreviated to "CPU") included in a control unit (not shown) is depicted by hollow bold arrows.

An analog image signal Ve for even-numbered pixels and an analog image signal Vo for odd-numbered pixels are outputted from the CCD 8 in synchronization with a drive pulse, alternating-current(a.c.)—coupled by capacitors C, and inputted in the analog signal processing unit 16.

A black offset level of each analog image signal Ve and Vo is then clamped to a predetermined potential by the clamp circuit 17. The analog image signals Ve and Vo are then made into a continuous analog signal by the sample-hold circuit 18 by sampling and holding the signals using sample pulses. After the output of the image signals Ve and Vo for odd-numbered pixels and for even-numbered pixels is matched with a fixed level at the amplifier circuit 19, the signal is multiplexed at the multiplexer 20 and made into an analog image signal V.

The analog image signal V is then amplified to the level of a reference voltage for A/D conversion by the amplifier circuit 21 and converted into 8-bit digital data by the A/D converter circuit 22. A digital image signal obtained in the above manner is then corrected for sensitivity fluctuation and irregular light-distribution of the light-emitting system for the pixels of the CCD 8 at the shading correction circuit 23, and subjected to digital processing such as γ-correction by the γ-correction circuit 24.

Pulse signals and control signals used in the operation of the CCD 8 and other circuits are generated at the timing signal generating circuit 27 based on a clock pulse of the oscillator 26 and are provided to each circuit. The timing signal generating circuit 27 is controlled by a CPU of a control unit (not shown).

With the analog signal processing unit 16 of an image reading device of the conventional technology, the analog image signals Ve, Vo outputted by the CCD 8 are a.c.—coupled by the capacitors C. At the clamp circuit 17 (this circuit has two), control is then exerted so that a black level of the analog image signal Ve (Vo) is clamped to a predetermined offset potential (black offset level), as shown in FIGS. 16 and 17.

At the clamp circuit 17, as shown in the timing chart of FIGS. 18A and 18B, a clamp pulse is inputted at a black reference pixel region (where pixels exist but are optically masked) of the CCD output occurring at the main scanning line period (period of a line synchronization signal LSYNC, referred to simply as "line period") of reading out image signals to one line from the CCD 8 using a CCD shift pulse. A clamp switch SW1 is then closed as shown in FIG. 17. The capacitor C is then charged so as to give a reference potential Vcc/2 that is a power supply voltage Vcc of the signal processing unit 10 divided by ½ by two resistors of the same resistance connected in series. After the clamp switch SW1 of the clamp circuit 17 is opened, the reference potential Vcc/2 and the offset analog image signal are inputted to the sample-hold circuit 18.

However, in the case of a circuit structure that a.c.—couples the analog image signal of the CCD 8 and carries out a clamping operation, when leakage current occurs between the a.c.—coupling capacitors C and the clamp circuit 17, a potential VL that is a reference for leakage and a leakage resistance RL exist virtually as shown in FIG. 16. A leakage current IL then flows at the capacitor C when the clamp switch SW1 is OFF and charging (or discharging) therefore takes place. When the clamp switch SW1 then goes ON as shown in FIG. 17, a current Isw flows due to charge charging up (or being discharged from) the capacitor C at the ON resistance of the clamp switch SW1. Therefore, a drop (or rise) in voltage occurs, and the offset potential of the image signal deviates from the clamp potential (Vcc/2).

At the sample-hold circuit 18 of the latter stage, the clamp potential (Vcc/2) is processed as a reference potential (black level). Offset deviation of the black level due to the magnitude of the leakage current can therefore no longer be ignored and deviation of this offset can be further amplified at the amplifier circuit 19 (FIG. 15) of the latter stage. A black offset correction circuit (not shown) is included within the analog signal processing unit 16 and has a correction range that is not so large but rather is normal. This means that correction cannot always be achieved depending on the extent of the offset deviation. The value of a digital image output for after quantization when offsets that cannot be corrected are taken as gray image data then becomes larger (or smaller), the density of the read image becomes lighter (or darker) than the actual density and this gives an abnormal image.

Leakage across wiring patterns of a printed wiring board (PWB) the circuit is mounted on, leakage of a.c.—coupling capacitors, and leakage occurring at the analog signal processing unit 16 (normally in the form of an integrated circuit) of the latter stage are given as causes of the occurrence of leakage current.

Deviation in the offset potential at the clamp circuit 17 depends on the ratio of the OFF period and the ON period of the clamp switch SW1. In the case of image reading devices having a number of line speeds depending on the reading mode, in the conventional art, the clamp period was fixed both in the case where the period is a long line period 1 as shown in FIG. 18A and in the case where the period is a short line period 2 as shown in FIG. 18B. The leakage current occurring due to the line period changing therefore changes and the offset potential changes.

The analog signal processing unit 16 tracks this change and ensures that adjustments are made by a black offset correction circuit (not shown) so as to attain a target black offset level even if the offset potential changes. However, when deviation of the offset potential due to changes in the line period is substantial, following this change becomes time-consuming and this influences the reading operation directly after changes in the line period.

Specific methods for black offset correction are as follows.

(1) A method that monitors output of a black reference pixel level after A/D conversion every main scanning line, provides feedback to input of a clamp circuit, and updates an offset correction value every line.

(2) A method of performing adjustment so that a black reference pixel level for after A/D conversion in an initialization operation when the power supply of the device is turned on becomes a desired value.

In the case of (1), the offset correction value is updated every line. However, rather than the whole of the difference between the target black offset level and the current offset level then being corrected in one line, some proportion of the difference is corrected in one line, with a target offset level then being converged upon over a number of lines. The reason for this is that attempting to follow in one line has the contrary effect of making it easier for noise to exert an influence.

When the line period then changes and the amount of the offset corrected by the black offset correction circuit changes, time corresponding to in the order of a number lines is required until this is dealt with.

In the case of (2), a correction value is obtained every line period when the power supply of the device goes ON, with the correction value changing every time the line period changes. Time is then required until the output level stabilizes after A/D conversion due to the response time of the circuit of the latter stage etc., although this is to a lesser extent than for (1).

SUMMARY OF THE INVENTION

It is an object of the present invention to at least partially solve the problems in the conventional technology.

According to an aspect of the present invention, there is provided an image reading device that includes an exposing unit that exposes an original document to light; a photoelectric converting unit that converts intensity of light reflected from the original document exposed to light by the exposing unit into an electrical signal, and outputs an analog image signal in a main scanning line period; a clamp unit that takes as input an alternating-current-coupled analog image signal outputted by the photoelectric converting unit, and matches an offset potential of the analog image signal with a predetermined clamp potential; a processing unit that subjects the analog image signal that has passed through the clamp unit to analog processing; a signal converting unit that converts the analog image signal subjected to analog processing by the processing unit into a digital image signal; a switching unit that switches the main scanning line period, and outputs analog image signals to the photoelectric converting unit at a plurality of reading speeds; and a changing unit that changes the clamp period of the clamp unit depending on the main scanning line period after switching by the switching unit.

According to another aspect of the present invention, there is provided an image reading device that includes an exposing unit that exposes an original document to light; a photoelectric converting unit that converts intensity of light reflected from the original document exposed to light by the exposing unit into an electrical signal and outputs an analog image signal in a main scanning line period; a clamp unit that takes as input an alternating-current-coupled analog image signal outputted by the photoelectric converting unit and matches an offset potential of the analog image signal with a predetermined clamp potential; a processing unit that subjects the analog image signal that has passed through the clamp unit to analog processing; a signal converting unit that converts the analog image signal subjected to analog processing by the processing unit into a digital image signal; a switching unit that switches the main scanning line period and outputs the analog image signal to the photoelectric converting unit at a plurality of reading speeds; a black correcting unit that corrects the black offset level of the analog image signal; a white correcting unit that corrects the white level of the analog image signal; and a control unit that controls the switching unit, the black correcting unit, and the white correcting unit so that after continuing to carry out black offset level correction and white level correction using the same main scanning line period, of a plurality of main scanning line periods capable of being switched by the switching unit, the main scanning line period is switched sequentially, and correction of the black offset level and the white level are continued using an identical main scanning line period.

According to still another aspect of the present invention, there is provided an image reading device that includes an exposing unit that exposes an original document to light; a photoelectric converting unit that converts intensity of light reflected from the original document exposed to light by the exposing unit into an electrical signal and outputs an analog image signal in a main scanning line period; a clamp unit that takes as input an alternating-current-coupled analog image signal outputted by the photoelectric converting unit, and matches an offset potential of the analog image signal with a predetermined clamp potential; a processing unit that subjects the analog image signal that has passed through the clamp unit to analog processing; a signal converting unit that converts the analog image signal subjected to analog processing by the processing unit into a digital image signal; a switching unit that switches the main scanning line period, and outputs the analog image signal to the photoelectric converting unit at a plurality of reading speeds; and an extending unit that extends the clamp period of the clamp unit as far as a valid pixel region of the main scanning line period directly after switching of the main scanning line period by the switching unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A and 5B are timing charts of a relation between line period, CCD output, and clamp pulses for an image reading device shown in FIG. 1;

FIG. 7 is a schematic diagram for explaining deviation of offset potential as a result of current flowing in the clamp switch when the clamp switch of the clamp circuit shown in FIG. 4 is ON;

FIGS. 10A to 10C are timing charts of examples where a clamp period is extended until a valid pixel region directly after switching a line period according to the embodiment;

DETAILED DESCRIPTION OF THE PREFERRED EMBODIMENTS

Exemplary embodiments of the present invention are explained in detail below with reference to the accompanying drawings. The present invention is not limited to the below embodiments.

Figure 1:
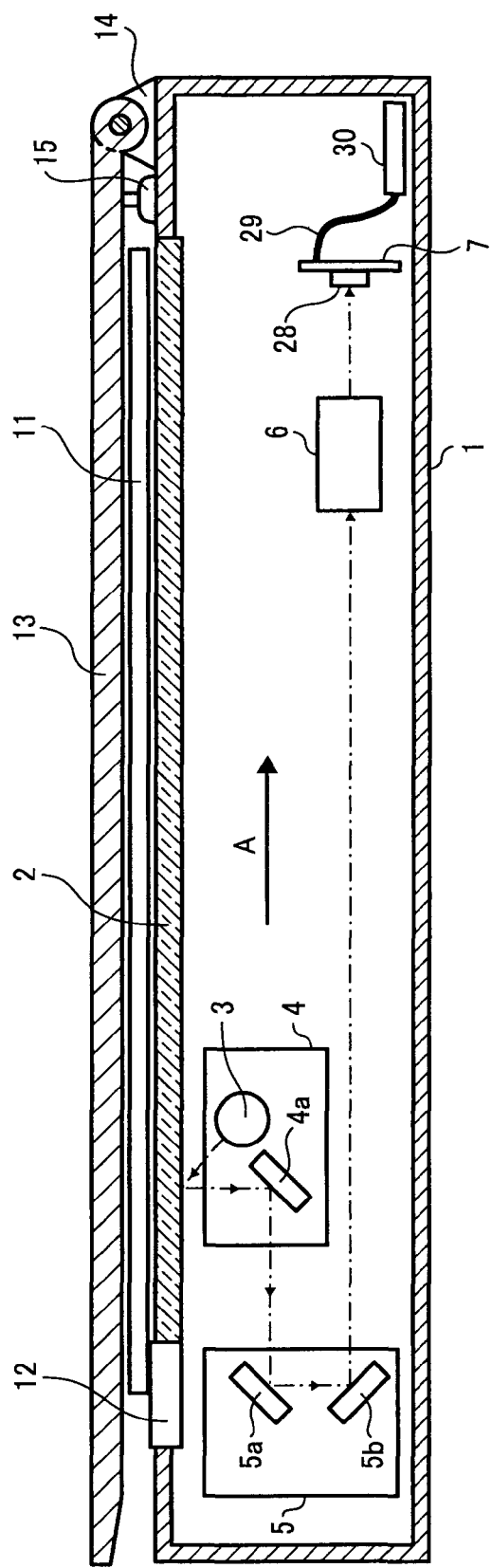
FIG. 1 is a schematic cross-sectional view of an image reading device according to an embodiment of the present invention.

FIG. 1 is a schematic cross-sectional view of an image reading device according to an embodiment of the present invention. Components that are the same as those in FIG. 14 are given the same numerals and the same explanation is not repeated.

Figure 14:
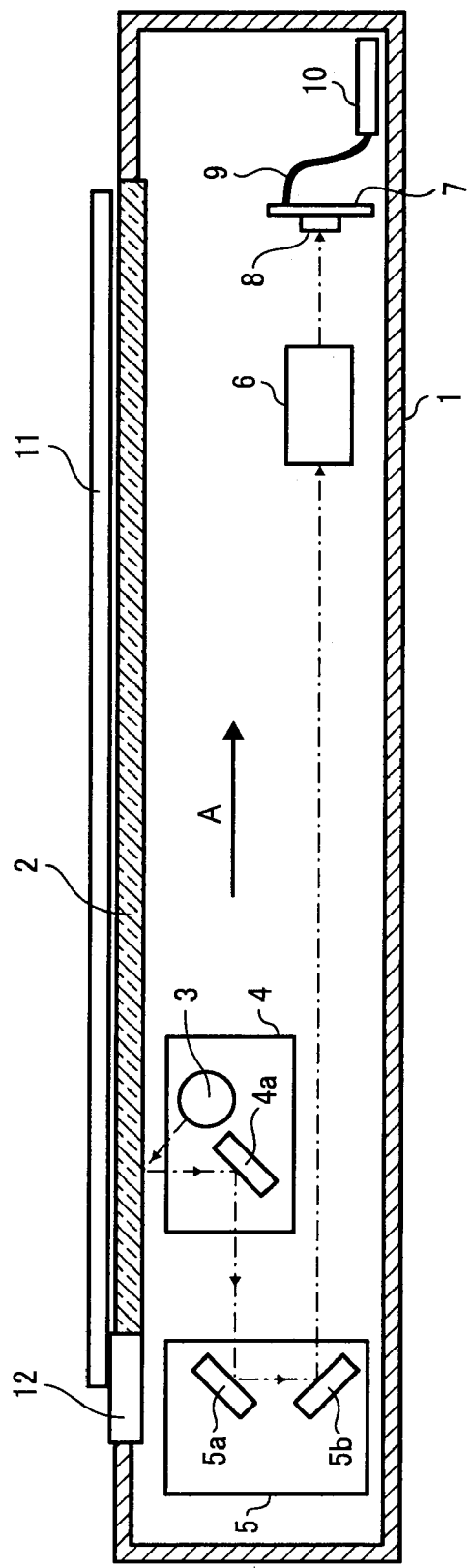
FIG. 14 is a schematic cross-sectional view of an image reading device according to the conventional technology.

The structure of an optical scanning system of the image reading device is the same as the image reading device of the conventional technology shown in FIG. 14. A pressure plate 13 that is an original document pressing member is fitted so as to be capable of being opened and closed by a hinge section 14 to cover the exposure glass 2 at the upper surface of the scanner body 1. The original document 11 is pushed flat onto the exposure glass 2 by the pressing plate 13 to block external light when reading the original document. A pressure plate opening and closing sensor 15 that detects opening and closing of the pressure plate 13 is also provided. A microswitch or photoelectric sensor etc. can be used as the pressure plate opening and closing sensor 15.

A color image reading device is exemplary described in the embodiment. The sensor board 7 includes a three-line CCD color linear image sensor (hereinafter, "three-line CCD") 28. The three-line CCD 28 has three reading lines (pixel lines) for analyzing and reading wavelength components for the usual three color components of red, green, and blue (RGB) as a photoelectric converting unit that converts light and shade of an image of the original document 11 formed by the lens unit 6 of the scanning optical system into an electrical signal for reading. Analog image signals for each color component of R, G, and B read by the three-line CCD 28 are inputted from the sensor board 7 to a signal processing unit 30 via a signal cable 29.

Figure 2:
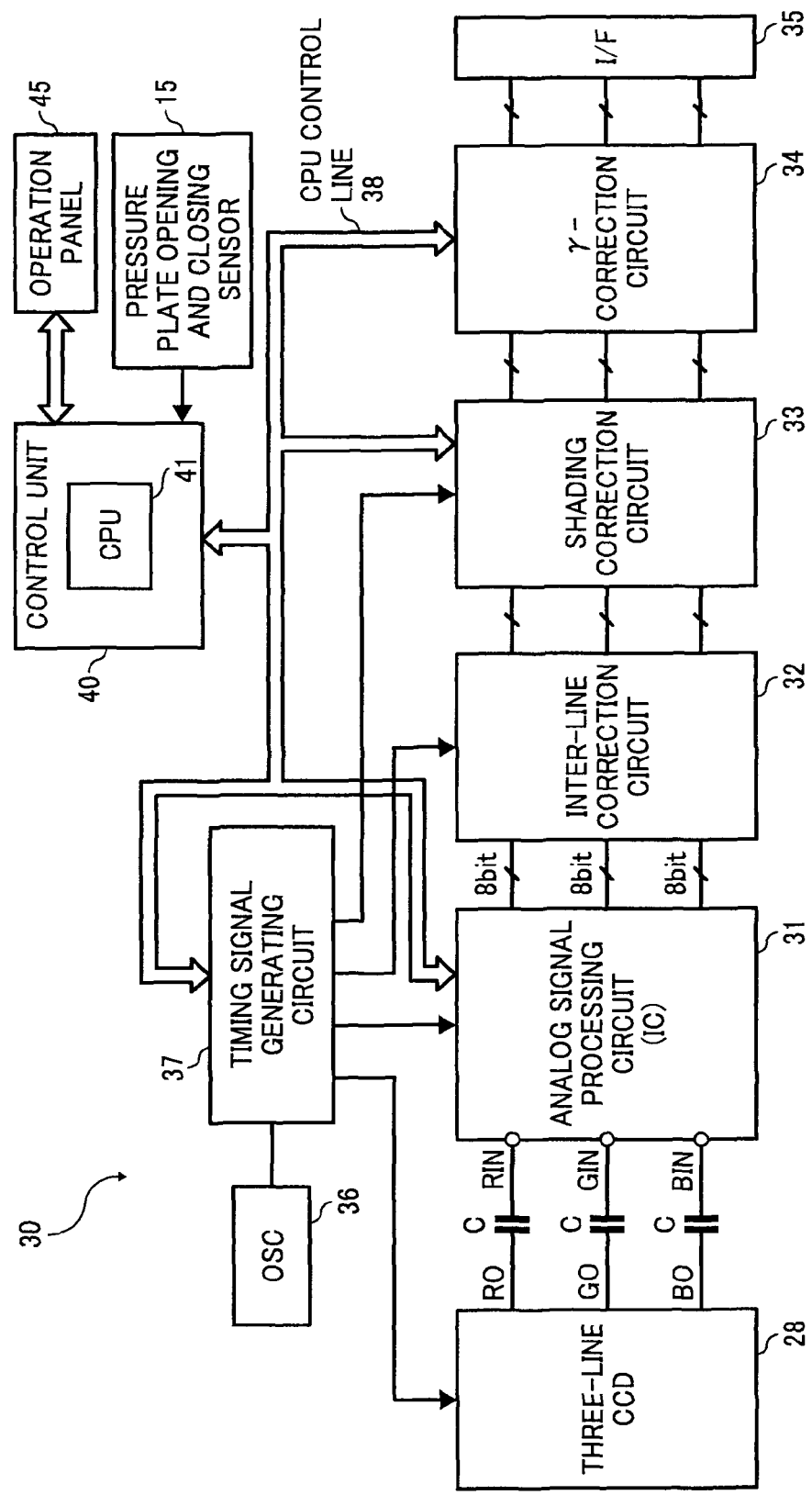
FIG. 2 is a block diagram of a signal processing unit shown in FIG. 1.

FIG. 2 is a block diagram of the signal processing unit 30. As with the conventional signal processing unit 10 shown in FIG. 15, the signal processing unit 30 subjects analog image signals for each color inputted from the three-line CCD 28 to analog signal processing, and converts the analog image signals to digital image signals that are subjected to digital image processing and outputted.

The signal processing unit 30 includes an analog signal processing circuit (analog front end (AFE)) 31 having input terminals RIN, GIN, and BIN. where R, G, and B analog image signals RO, GO, and BO outputted by the three-line CCD 28 are inputted to after being a.c.—coupled via capacitors C, followed by an inter-line correction circuit 32, a shading correction circuit 33, a γ-correction circuit 34, an interface (I/F) 35, an oscillator (OSC) 36, and a timing signal generating circuit 37 that controls the operation timing of each part (circuit).

The circuits are connected to a microcomputer (hereinafter, "CPU") 41 of a control unit 40 that controls the image reading device via a CPU control line 38.

An operation panel 45 for performing operations such as read mode selection, and the pressure plate opening and closing sensor 15 are connected to the control unit 40.

The timing signal generating circuit 37 generates pulse signals and control signals for driving the three-line CCD 28 and necessary in the operation of other circuits from a clock pulse of the OSC 36 under instruction from the CPU 41, and provides the pulse signals and control signals to each circuit.

Figure 3:
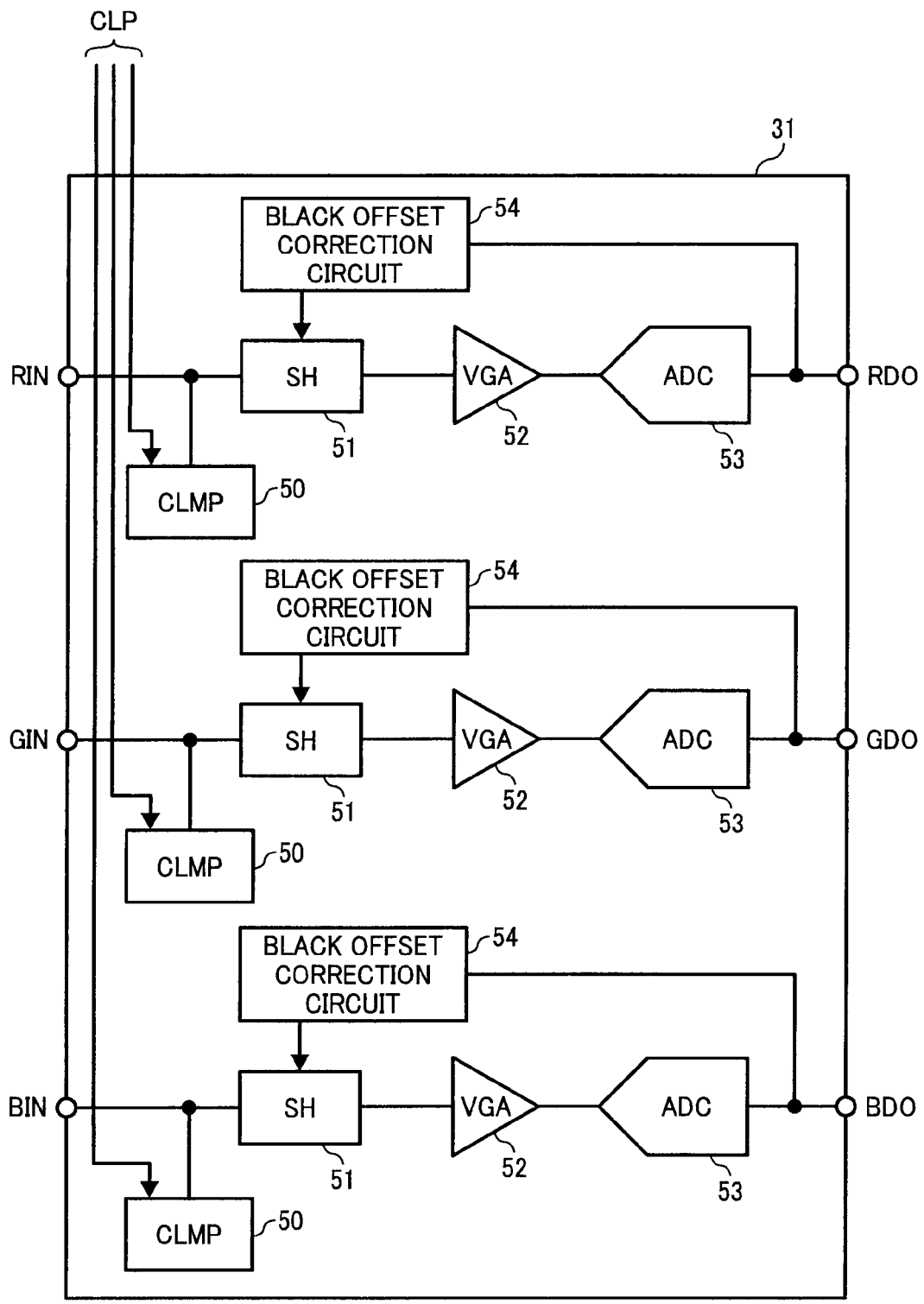
FIG. 3 is a block diagram of an analog signal processing circuit shown in FIG. 2.

As shown in FIG. 3, the analog signal processing circuit 31 includes three systems of a signal processing system including a clamp circuit (CLMP) 50, a sample-hold circuit (SH) 51, an amplifier circuit 52 of a voltage-controlled variable gain amplifier (VGA), an A/D converter circuit (ADC) 53, and a black offset correction circuit 54, every input terminal RIN, GIN, and BIN. Digital image signals for each system are then respectively outputted from each of the output terminals RDO, GDO, and BDO. The analog signal processing circuit 31 can be made from a semiconductor integrator circuit (IC).

The clamp circuit 50 is a clamp unit for matching offset potential of an inputted analog image signal to a predetermined clamp potential. The sample-hold circuit 51 and the amplifier circuit 52 are units that subject analog image signals that have passed through the clamp unit to analog processing. The A/D converter circuit 53 is an A/D converter unit for converting analog image signals subjected to the analog processing into digital image signals. The black offset correction circuit 54 is a black-offset-level correcting unit that corrects the black offset level of analog image signals.

The control unit 40 performs the functions of a line period switching unit, a clamp period changing unit, and a clamp period extending unit. The line period switching unit switches a main scanning line period, and outputs an analog image signal to the three-line CCD 28 that is a photoelectric converting unit at a number of reading speeds. The clamp period changing unit changes the clamp period of the clamp circuit 50 that is a clamp unit in accordance with the main scanning line period after switching by the line period switching unit. The clamp period extending unit extends the clamp period to a valid pixel region of the main scanning line period directly after switching of the main scanning line period.

The control unit 40 also functions as a white level correcting unit that corrects the white level of the analog image signal together with the amplifier circuit 52. The control unit 40 also functions as a control unit that controls the operation of the line period switching unit, the black offset level correcting unit, and the white offset level correcting unit. Specifically, the control unit 40 controls the units in such a manner that, after continuing to carry out black offset level correction and white level correction in the same main scanning line period, of the number of main scanning line periods where switching is possible, the main scanning line period is switched over sequentially, and correction of the black offset level and correction of the white level is continued at a further same main scanning line period.

Figure 4:
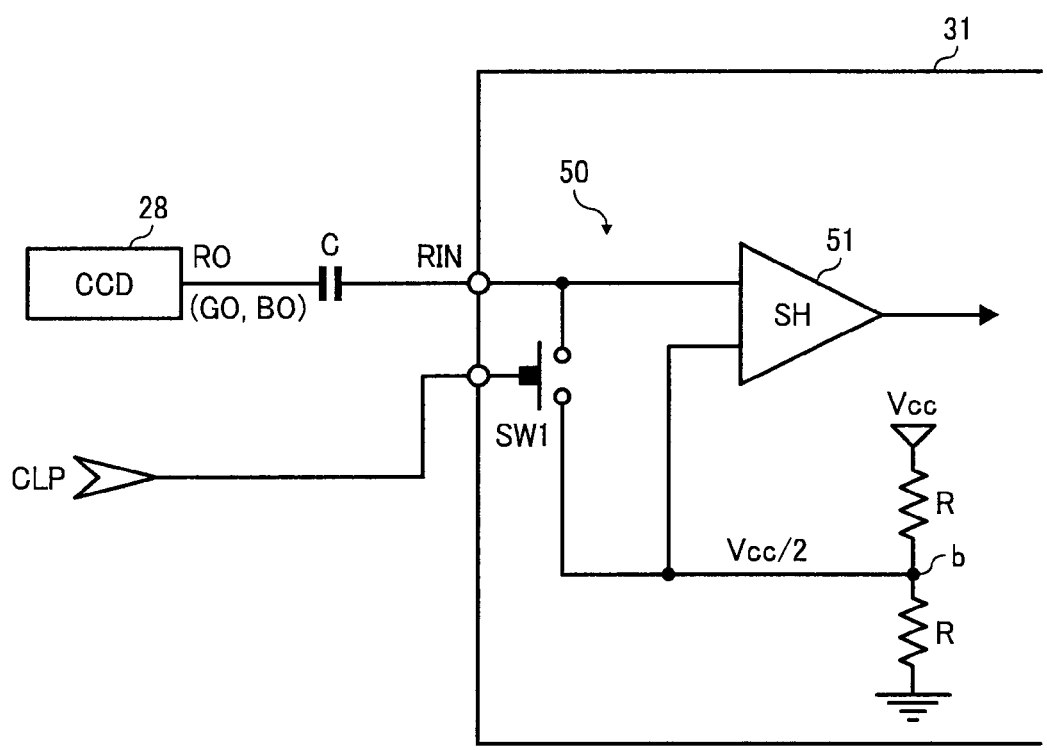
FIG. 4 is a circuit diagram of a clamp circuit shown in FIG. 3.

As shown in FIG. 4, the clamp circuits 50 for each system are made from a voltage dividing circuit that divides the power supply voltage Vcc in half using two resistors R of the same resistance connected in series to give reference voltage Vcc/2, and a clamp switch SW1 provided across a voltage dividing point b and an input terminal (RIN in the case of the R system). The clamp switch SW1 is a switching element such as a switching transistor that is usually OFF that goes ON upon the application of a clamp pulse CLP outputted by the timing signal generating circuit 37.

The clamp circuits 50 of each system apply a clamp pulse CLP only during a clamp period of an appropriate timing synchronized with the main scanning line period where analog image signals RO, GO, and BO are outputted from the respective three-line CCDs 28.

Other circuits at each system of the analog signal processing circuit 31 operate for just a predetermined period at an optimum timing as a result of control pulses outputted respectively by the timing signal generating circuit 37. Each of these signal lines is omitted from FIG. 3.

The operation of the signal processor 30 is explained in detail below.

Analog image signals RO, GO, and BO are outputted from the three-line CCD 28 in synchronization with the drive pulse, a.c.—coupled by respective capacitors C, and inputted to the analog signal processing circuit 31.

An offset level is determined at the clamp circuit 50 within the analog signal processing circuit 31. The image signal is then made to be a continuous analog signal by sampling and holding the image signal including noise by the sample-hold circuit 51 so as to perform sampling and holding using the sample pulses outputted from the respective timing signal generating circuit 37. The analog image signal is then amplified to the level of a reference voltage for A/D conversion by the amplifier circuit 52, and converted into an 8-bit digital image signal (data) by the A/D converter circuit 53. The required offset voltage is then be applied by the black offset correction circuit 54 so that the offset level set at the clamp circuit 50 attains the desired level.

The image reading device has two line speeds, high speed reading mode and low speed reading mode (for high image quality). In selection of the reading mode, the control unit 40 determines the reading mode based on selection signals generated as a result of operation from a user using the operation panel 45, or when being connected to a network, based on commands from equipment connected to the image reading device. Speed switching due to changing of the reading mode is implemented by changing the exposure time, i.e., the main scanning line period (period of the CCD shift signal) of the three-line CCD 28 in the main scanning direction. The speed switching is implemented in a sub scanning direction (direction of an arrow A shown in FIG. 1) by changing the speed of movement of the first carriage 4 and the second carriage 5 using a stepping motor.

Digital image signals for each color outputted by the analog signal processing circuit 31 are corrected for time differences in a sub scanning direction between outputs of analog image signals from the three lines for R, G, and B at the three-line CCD 28 at the inter-line correction circuit 32. Predetermined density levels are then obtained and stored for every color component at/in the shading correction circuit 33 by reading reflected light of the white reference plate 12 irradiated by the xenon lamp 3 using the three-line CCD 28. The density levels are used to correct sensitivity fluctuations and light distribution irregularities for the light emitting system of the three-line CCD 28. The digital image signals are then subjected to digital processing such as γ correction (brightness correction to obtain a close to natural output image) at the γ-correction circuit 34, and output from the interface 35.

A clamp operation for determining the offset level is explained with reference to FIGS. 4 to 7. In the explanation below, "main scanning line period" is referred to simply as "line period". FIGS. 5A and 5B are timing charts of a relation between line period, CCD output, and clamp pulses, showing a comparison of the case of a line period 1 of FIG. 5A and the case of a line period 2 (line period 1>line period 2) of FIG. 5B.

As shown in FIGS. 5A and 5B, a clamp pulse is inputted to each system during a dummy period of the three-line CCD 28. The clamp switches SW1 shown in FIG. 3 then go ON at the clamp circuits 50 of each system for just the period of a high level. Each capacitor C is charged up, and the level of the black offset potential of the analog image signal of the three-line CCD 28 is normally matched to Vcc/2.

Figure 6:
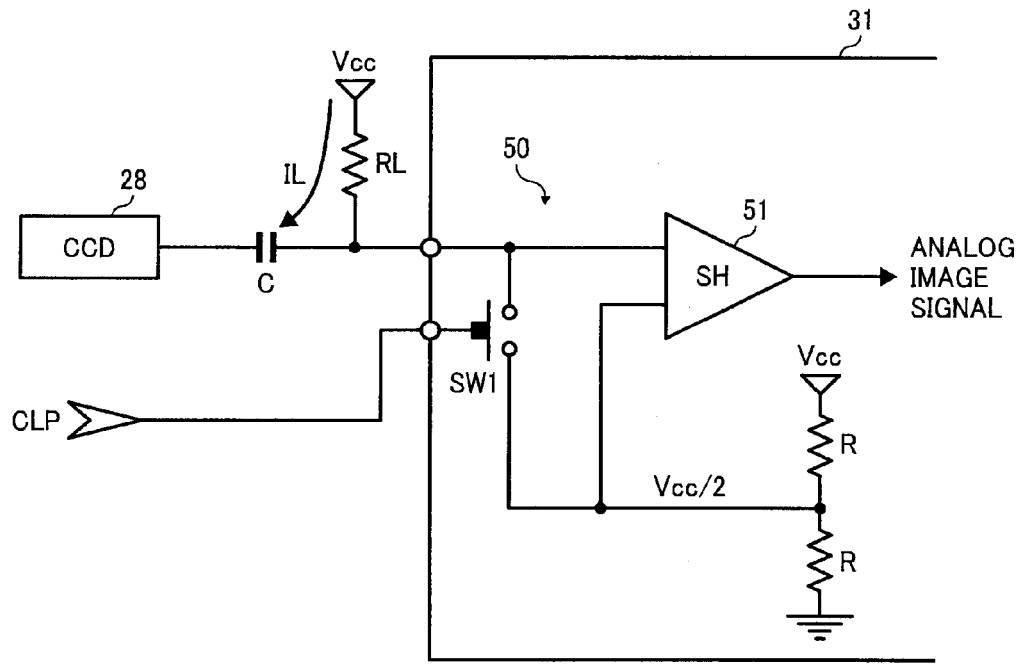
FIG. 6 is a schematic diagram for explaining leakage current occurring when a clamp switch of the clamp circuit shown in FIG. 4 is OFF.
Figure 7:
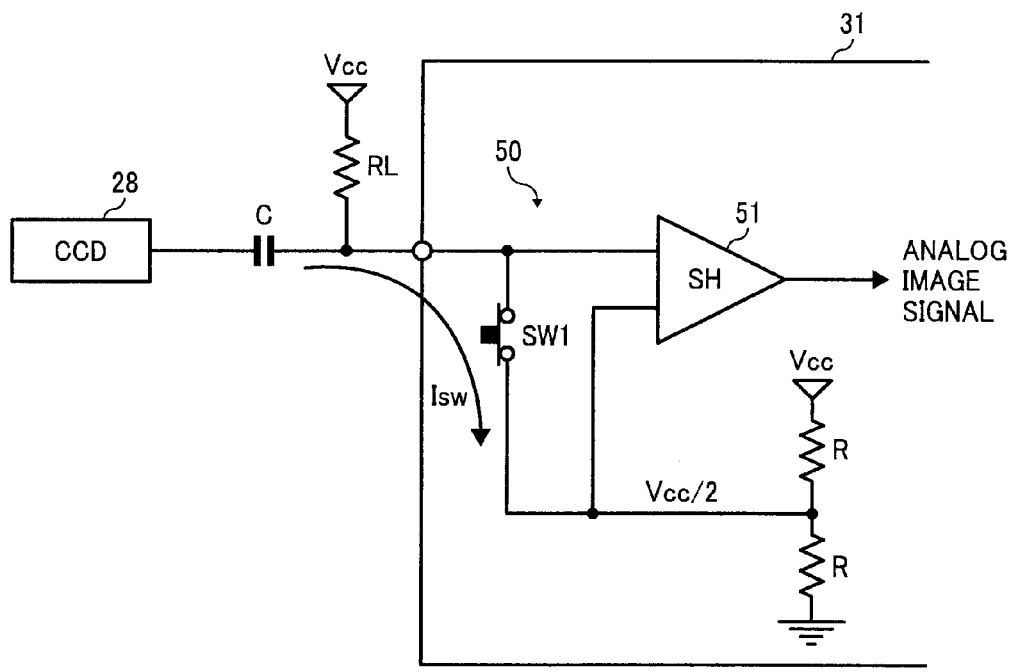

However, when leakage current occurs across the capacitors C for a.c.—coupling use and the clamp circuits 50, a potential VL (which is Vcc here) that is a leakage reference and a leakage resistance RL exist virtually as shown in FIG. 6. When the clamp switch SW1 is OFF, a leakage current IL flows to the capacitors C, and the capacitors C charge up (or discharge). When the clamp switch SW1 then subsequently goes ON as shown in FIG. 7, charge flows in as current ISW at the ON resistance of the clamp switch SW1 so as to charge up (or discharge) the capacitors C. This causes the voltage to fall, and the offset potential of the analog image signal deviates from the clamp potential (VCC/2).

The leakage current IL (FIG. 6) generated at this time is represented as follows:

$$IL = (Vcc - Vcc/2)/RL$$

Charge $\Delta Q$ charging up the capacitors C while the clamp switch SW1 is OFF becomes:

$$\Delta Q = (\text{line period}) \times IL$$

As the line period is normally longer than the clamp period, the current ISW flowing at the ON resistance when the clamp switch SW1 is ON becomes:

$$Isw \approx \Delta Q/\text{clamp period} = (\text{line period}/\text{clamp period}) \times IL$$

Deviation $\Delta V$ of the offset potential generated by Isw is denoted by:

$$\Delta V = (\text{line period}/\text{clamp period}) \times IL \times Rsw$$

Switching the line period and changing the clamp period is described below.

The clamp period of the clamp unit is changed according to the line period after switching while switching the line period. In the event that the line period is switched over from the line period 1 of FIG. 5A to the shorter line period 2 of FIG. 5B, the clamp period is also made shorter accordingly so as to give:

line period 1/clamp period 1 = line period 2/clamp period 2

However, the ratio of the line period and the clamp period substantially does not change even when the line period is switched. Therefore, no change in the deviation $\Delta V$ of the offset potential occurs.

Even if the line period changes due to changing of the reading mode, stable image reading is possible directly after switching of the line period without the offset potential of the analog image signal deviating substantially, as can be discerned from the equation for calculating $\Delta V$.

Switching of the line period and switching of the clamp period are carried out by changing the setting of the timing signal generating circuit 37 using the control function of the CPU 41, synchronizing the line synchronization signal (LSYNC) with respect to the three-line CCD 28, and changing the pulse width of the clamp pulse CLP with respect to each clamp circuit 50.

Black offset level correction and white level correction are described below.

Line speed (line period) and deviation $\Delta V$ of offset potential have the following relation:

$$\Delta V = (\text{line period}/\text{clamp period}) \times IL \times Rsw$$

Typically, the value of $\Delta V$ also changes when the line speed is switched.

With this change, the following time is determined by the time constant for the capacitance of the a.c.—coupling capacitors C and the ON resistance of the clamp switches SW1. However, a capacitance in the order of microfarads is used as the capacitor C; and therefore, the time taken in following becomes long.

It is necessary to perform adjustment every switchable line period while determining gain set at the amplifier circuit 52 within the analog signal processing circuit 31 and the amount of offset applied by the black offset correction circuit 54 before starting the reading operation directly after the power supply going on. The gain is determined in such a manner that the white reference plate 12 is read and the result is set to the gain value to give the desired value.

Such setting (adjustment or correction) is typically carried out in the following order for different line speeds (line period 1 and line period 2) with image reading devices in the conventional technology.

1. Determine extent of black offset correction for line period 1
2. Determine extent of black offset correction for line period 2
3. Determine extent of gain setting for line period 1 (white level correction)
4. Determine extent of gain setting for line period 2 (white level correction)

With the above adjustment order, switching of line speed (line period) occurs for a number of times, and therefore, deviation of offset becomes large. When processing takes place for a short time, the processing cannot be carried out in a reliable manner because of the influence of the offset deviation when determining the amount of black offset correction for the line period 2 after determining the amount of black offset correction for the line period 1. Furthermore, when weighting is applied in order to stabilize deviation of the offset for every processing, the time taken for starting up the image reading device becomes longer.

According to the embodiment, setting (adjustment or correction) is therefore carried out in the following order for different line speeds (line period 1 and line period 2).

1. Determine extent of black offset correction for line period 1
2. Determine extent of gain setting for line period 1 (white level correction)
3. Determine extent of black offset correction for line period 2
4. Determine extent of gain setting for line period 2 (white level correction)

By implementing this adjustment order, the number of times of switching of line speed (line period) where offset deviation occurs is reduced. Therefore, it is possible to reduce the number of times of waiting for the following time, and the time taken to start up the image reading device can also be reduced.

Figure 8:
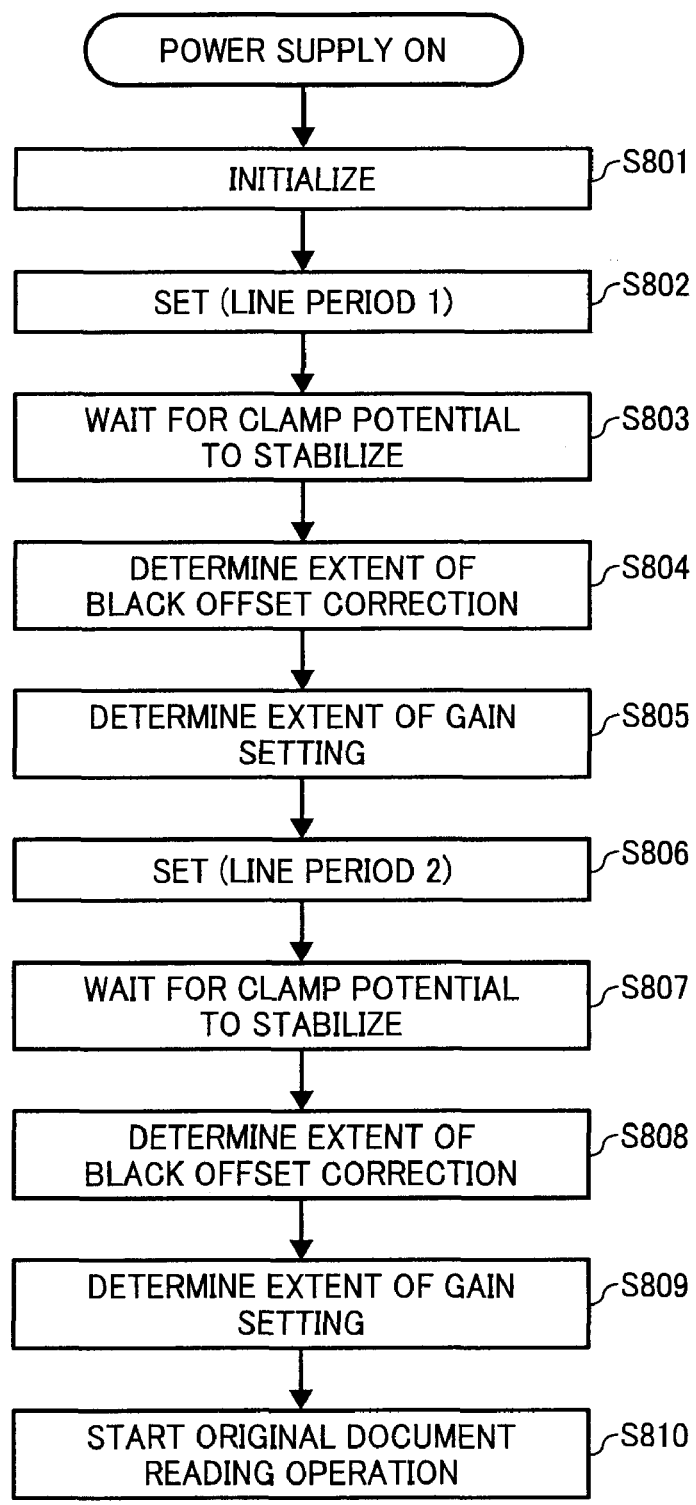
FIG. 8 is a flowchart of processing for determining amounts of black offset correction and gain setting (white level adjustment) for each line period according to the embodiment.

FIG. 8 is a flowchart of processing for carrying out the adjustment by the CPU 41.

The processing starts when the power supply of the image reading device goes ON. Initialization is performed on the circuit (Step S801), the line period 1 is set (Step S802), and stabilization of the clamp potential is awaited (Step S803). When the clamp potential stabilizes, the amount of black offset correction is determined (Step S804), and the amount of gain setting is determined (white level adjustment) (Step S805). Line period 2 is then set (Step S806), and stabilization of the clamp potential is awaited (Step S807). When the clamping potential stabilizes, the amount of black offset correction is determined (Step S808), the amount of gain setting is determined (white level adjustment) (Step S809), and the original document reading operation starts (Step S810).

Figure 9:
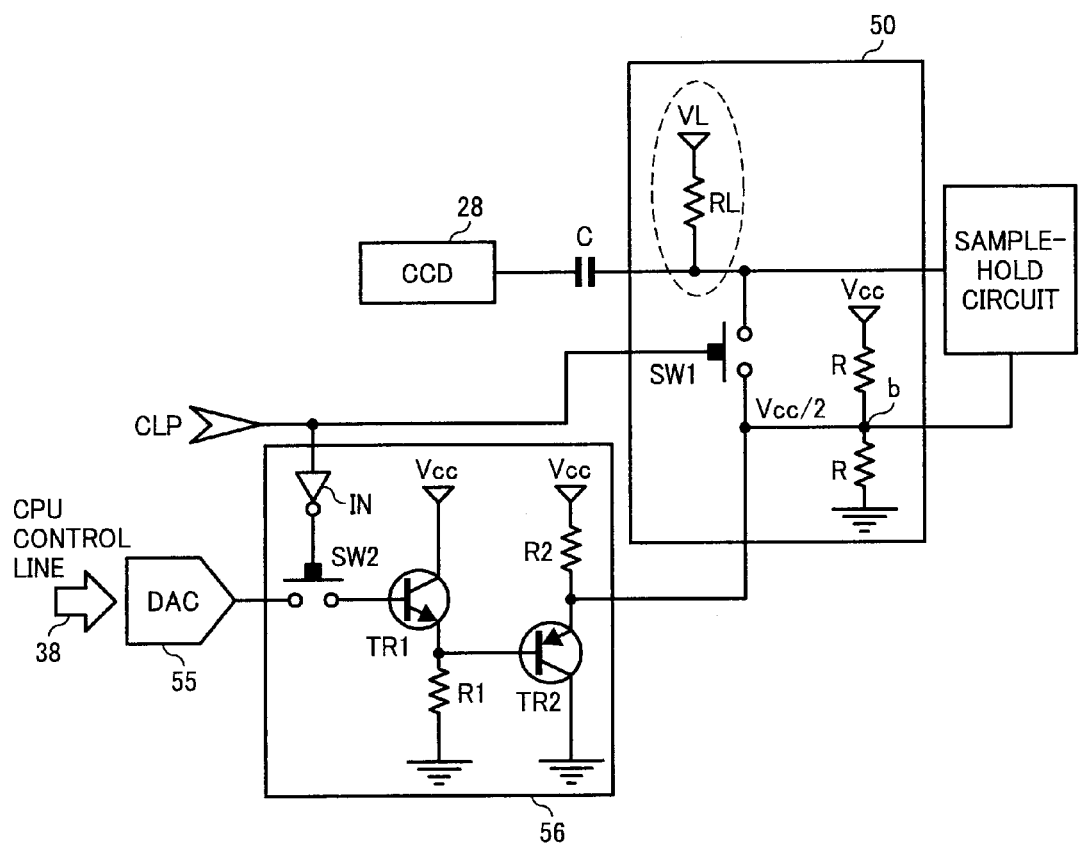
FIG. 9 is a circuit diagram of a clamp circuit for controlling clamp potential by using external units according to the conventional technology.

FIG. 9 is a circuit diagram of a clamp circuit for controlling clamp potential by using external units according to the conventional technology disclosed in the Japanese Patent Application Laid-Open No. 2006-211042.

A digital-to-analog (D/A) converter circuit 55 and a clamp potential drive circuit 56 are added to the clamp circuit 50. The D/A converter circuit 55 is set with adjustment data from the CPU 41 via the CPU control line 38. The clamp potential drive circuit 56 applies the adjustment data D/A converted so that a D/A converted analog voltage is added to the reference voltage Vcc/2 at a period where the clamp pulse CLP is at a low-level non-clamp period.

The clamp potential drive circuit 56 includes an electronic switch SW2, an inverting circuit IN that inverts the clamp pulse CLP and puts the switch SW2 ON in a non-clamp period, and an emitter-follower circuit including two transistors TR1 and TR2 and two resistors R1 and R2. The clamp potential occurring at non-clamp periods is made to be (Vcc/2)+X[V].

Here, X is a regulating voltage applied through the clamp potential drive circuit 56.

An appropriate sample-hold output can then be obtained by the sample-hold circuit 51 because the offset level of the image signal for the valid pixel period equals to the clamp potential.

The value for the regulating voltage X is made to be a value corresponding to the amount of offset deviation by adjusting the value set for the D/A converter circuit 55. It is then possible to control the clamp potential so as to cancel out deviation of the offset due to the leakage current.

Adjustment data for appropriate setting values are then set for every line period for image reading devices having a number of line periods. This setting is carried out for every line period by monitoring the digital image signal outputted by the A/D converter circuit 53 in the black reference pixel region of the three-line CCD 28 and setting the adjustment data so that a desired image data output is obtained.

The difference between the setting value for the adjustment data depending on the line period and the output voltage increases when leakage current increases. During this time, the time from following the difference until the clamp potential becomes stable is determined as the following time by a time constant that is the sum of the capacitance of the a.c.—coupling capacitors and the ON resistance of the clamp switch SW1 at the time of the clamp period (when SW1 is ON).

When the follow time is taken to be 2.2 τ (approximately 90% follow) with respect to the time constant τ for the capacitance of the a.c.—coupling capacitors C and the ON resistance of the clamp switch SW1, the time T until the potential stabilizes can be expressed as follows:

$$T=2.2\,\tau \times (\text{line period})/(\text{clamp period}) \quad (1)$$

As shown in the timing chart of FIGS. 10A to 10C, it is possible to make the time T taken for the potential to stabilize dramatically shorter by lengthening the clamp period directly after switching as far as the valid pixel region while switching from the line period 1 of FIG. 10A to the line period 2 of FIG. 10B of a different period as represented by the following:

$$T=2.2\,\tau \times (\text{line period})/\{(\text{clamp period within dummy period})+(\text{clamp period within valid pixel period})\} \quad (2)$$

After waiting a time T, as shown in FIG. 10C, a reading operation starts for a normal clamp period (shorter than the clamp period for line period 1) appropriate for line period 2.

Therefore, it is possible to make the response of the clamp potential fast by lengthening the clamp period directly after image reading line speed (line period) switching to also include a valid pixel region. Image reading is then possible at a switched line speed after switching line speed (line period) by returning to a normal clamp period appropriate for the line period for after switching after the clamp potential stabilizes.

It is preferable to use the valid pixel region in the clamp period only in the case where the pressure plate 13 or an original document pressing plate of an automatic original document feeding device is closed. This is because extraneous light may be incident on the three-line CCD 28 if the original document pressing plate is open.

Thus, according to the embodiment, a detection signal from the pressure plate opening and closing sensor 15 that detects opening of the pressing plate is monitored. The clamp period is then lengthened as far as the valid pixel region directly after switching of the line period only when the pressing plate 13 is closed. Therefore, it is possible to achieve a rapid clamp potential response during line speed switching without incurring the influence of extraneous light.

Figure 11:
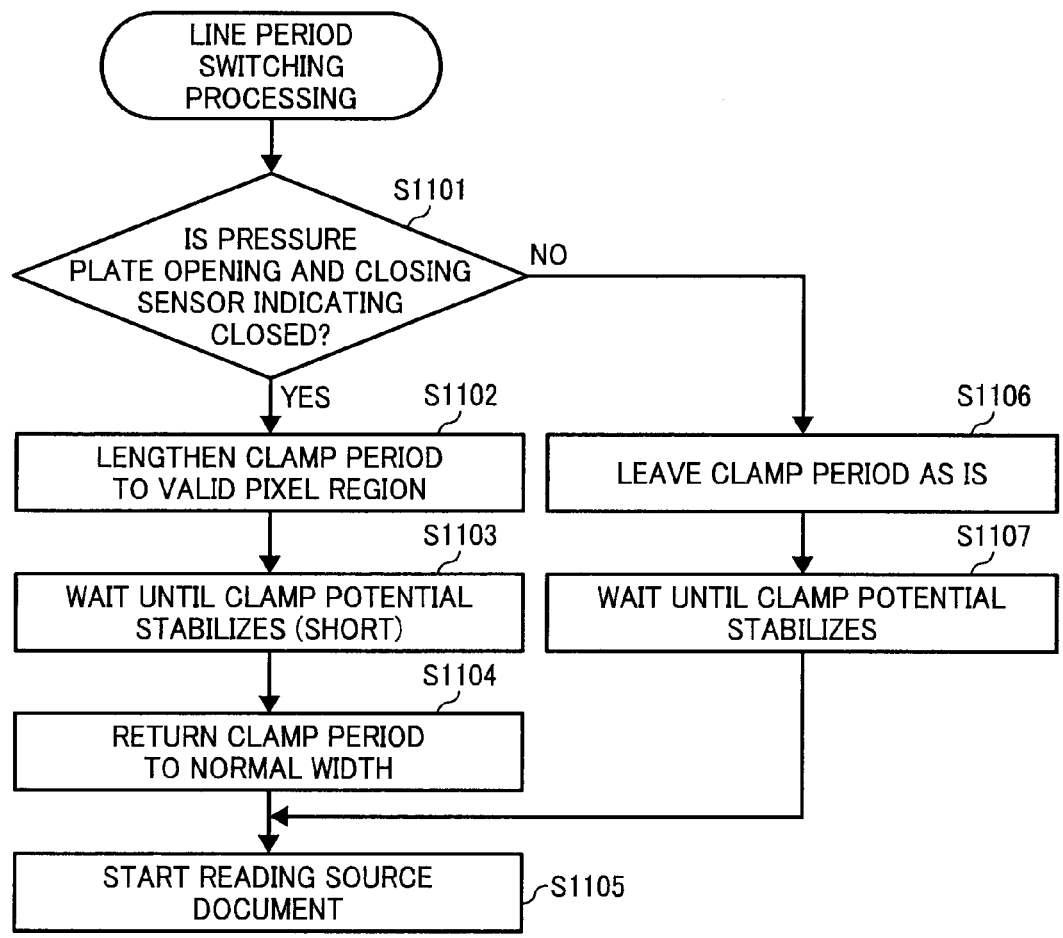
FIG. 11 is a flowchart of processing executed by a central processing unit (CPU) shown in FIG. 2.

FIG. 11 is a flowchart of processing executed by the CPU 41.

The processing commences when the line period is switched. A detection signal of the pressure plate opening and closing sensor 15 is monitored. It is then determined whether the detection signal indicates closing of the pressure plate (Step S1101). When closing is not indicated (NO at Step S1101), the clamp period remains as is (a clamp period in line with the line period for after switching) (Step S1106). The operation of reading in the original document is then commenced after waiting for the clamp potential to stabilize (Step S1107). The waiting time T at this time is calculated by Equation (1), which is long.

In the above determination, when the detection signal indicates closing (YES at Step S1101), the clamp period is lengthened as far as the valid pixel region (Step S1102), and stabilizing of the clamp potential is awaited (Step S1103). The waiting time T at this time is calculated by Equation (2), which is short. The clamp period is then returned to a normal width (a clamp period in line with the line period for after switching) (Step S1104), and the operation of reading in the original document starts (Step S1105).

When the image reading device includes an automatic original document feeder, a sensor for detecting whether the original document pressing plate is opened or closed is included in place of the pressure plate opening and closing sensor 15. The detection signal is then monitored when the line period is switched over. The clamp period is lengthened up to the valid pixel region only when the detection signal indicates closing of the pressure plate.

Setting of the clamp period to the dummy period is explained below.

Figure 12:
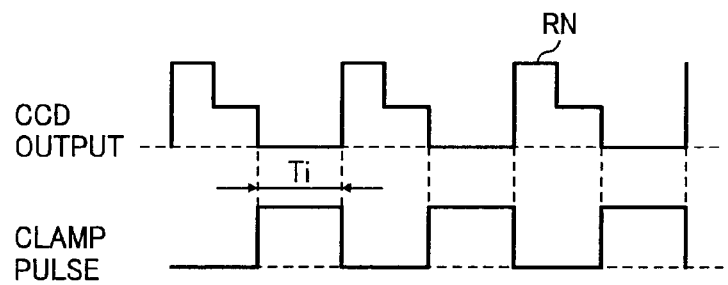
FIG. 12 is a wave diagram of a CCD output and a clamp pulse enlarged along a time axis according to the embodiment.
Figure 18A:
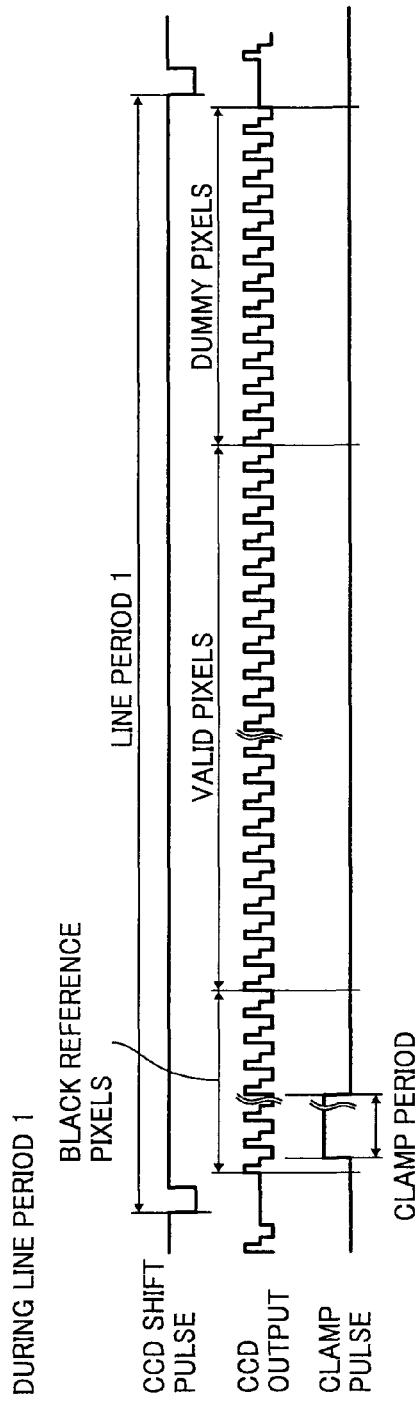
FIGS. 18A and 18B are timing charts of a relation between line period, CCD output, and clamp pulses for an image reading device according to the conventional technology.
Figure 18B:
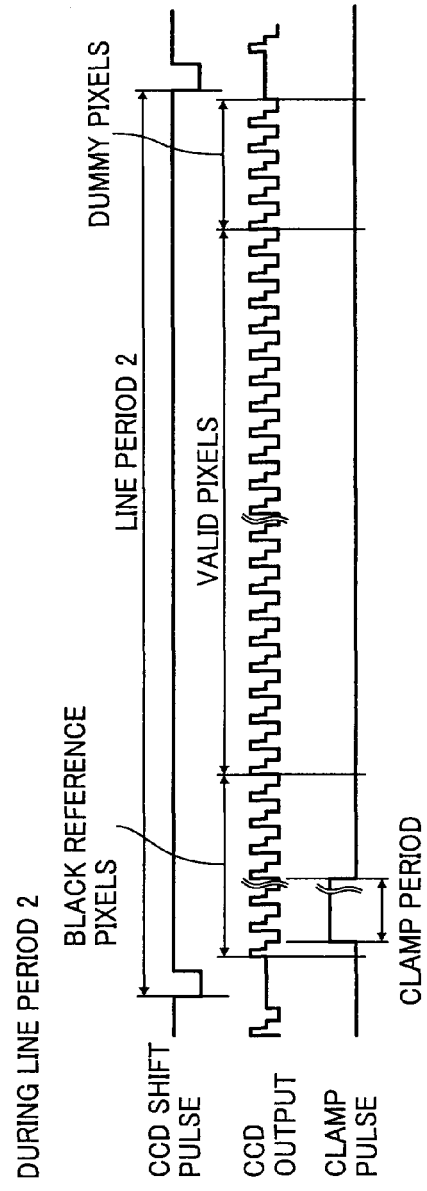

A logical sum for clamp pulses shown in the timing charts of FIGS. 5, 10 and 18 and clock pulses at a high level only during an image signal region period for every one pixel of CCD output is taken within the analog signal processing circuit. A waveform expanded on a time axis for the CCD output and the clock pulse is shown in FIG. 12. Specifically, rather than being continuous for the period of the pulse widths shown in FIGS. 5, 10, and 18, the clamp pulses become a high level with the clamp switch SW1 being put ON only during an image signal region period Ti and not in the periods where reset noise RN occurs every pixel of the CCD output.

When a reading speed of a line speed of 200 mm/s is required, the number of reading lines for one second when reading at 600 dpi is one inch (≠25.4 millimeters) and can therefore be calculated as follows:

$$200 \times 600/25.4 = 4724 \text{ lines}/s$$

The line period corresponding to the reading time for one line is represented as follows:

$$1/4724 = 212 \text{ microseconds}$$

Within this time, a clock for a portion of 7500 pixels that is the valid pixels and black reference pixels is transferred. This pixel frequency is represented as follows:

$$1/(212/7500) = 35.38 \text{ megahertz}$$

When a clamp period is taken within a black reference pixel period as in the conventional technology described in connection with FIG. 18, the number of black reference pixels is approximately 100. However, in reality, a black detection period for the black offset correction circuit and a black detection period for black subtraction processing of subtracting offset added by the analog signal processing circuit at a latter stage are also required in addition to the clamp period at the black reference pixel period. This means that in reality only approximately half, i.e., approximately 50 pixels of the number of black reference pixels, can be used for the clamp period. The clamp period is therefore approximately 50 times the pixel period as represented by the following:

$$1/35.38 \times 50 = 1.4 \text{ microseconds}$$

In reality, the clamp operation only takes place in the image signal region period Ti (approximately ½ of the pixel period) shown in FIG. 12. The actual clamp period is therefore:

$$1.4/2 = 0.7 \text{ microsecond}$$

which is short.

Space transfer pixel periods after the valid pixel periods occurring at line periods of the three-line CCD 28 are used in the embodiment as shown in the timing charts of FIGS. 5 and 10. Therefore, it is possible to ensure a sufficient clamp period.

Leakage current generated from the a.c.—coupling capacitors C to the input terminals of the analog signal processing circuit 31 is calculated in advance. The clamp period is then lengthened so that an error for the clamp potential due to the leak current is reduced to a level where correction is possible at the black offset correction circuit 54 of the latter stage.

Clamp potential error ΔV due to the leakage current is calculated from the leakage current occurring from the a.c.—coupling capacitors C to the input terminals of the analog signal processing circuit 31 as follows:

$$\Delta V = (\text{line period/clamp period}) \times \text{leakage current} \times \text{clamp switch ON resistance}$$

The clamp period can then be set so that ΔV becomes a level capable of correction at a black offset correction circuit of a latter stage.

Therefore, it is possible to reduce the deviation of the offset voltage due to the leakage current to a level that does not present any practical problems by making a dummy period capable of ensuring the necessary period the clamp timing in the setting for the end side after the main scanning that is the CCD line scanning.

The dummy period differs from the black reference pixel period in that it is a period where pixels are not present. However, waveforms outputted by the CCD are substantially the same waveforms and voltage levels as for the black reference pixels, and therefore, substitution does not present a problem.

Leakage current occurring from the a.c.—coupling capacitors C up to input to the analog signal processing circuit 31 can be estimated by calculating the worst case value in advance. In the embodiment, the worst case value for the leakage current is estimated in advance. Therefore, an appropriate clamp period is obtained and deviation of offset voltage due to leakage current can be reduced to a level that does not present practical problems.

For example, error (deviation) ΔV for the leakage current and offset voltage is calculated under the following conditions:

a.c.—coupling capacitors: 2.2 microfarads
Clamp switch ON resistance: 297.5 ohms
Power supply voltage: 3.3 volts
Clamp potential: 1.65 volts
CCD output offset (a.c.—coupling input): 6.5 volts
Leakage between electrodes of board: 100 MOhms/mm
a.c.—coupling capacitor leakage: 500 MOhms/μF
Pin pitch of analog signal processing circuit (IC): 0.2 millimeters
Correction range of black offset correction circuit: ±100 millivolts
Gain range of analog signal processing circuit (IC): 1 to 10 times
Neighboring pins for input pins of analog signal processing circuit (IC):
Neighboring pin 1: Clamp potential
Neighboring pin 2: Vcc potential
Internal leakage of analog signal processing circuit (IC): 50 nanoamperes
Inter-pin leakage of analog signal processing circuit (IC):

$$(3.3 \text{ volts} - 1.65 \text{ volts})/100 \text{ M}\Omega/\text{mm} \times 0.2 \text{ millimeter} = 82.5 \text{ nanoamperes}$$

Leakage current between pads of the a.c.—coupling capacitors (chip capacitors):

$$(6.5 \text{ volts} - 1.65 \text{ volts})/(100 \text{ M}\Omega/\text{mm} \times 0.3 \text{ millimeter}) = 161.7 \text{ nanoamperes}$$

Leakage current between electrodes of a.c.—coupling capacitors:

$$(6.5 \text{ volts} - 1.65 \text{ volts})/(500 \text{ M}\Omega \cdot \mu F/2.2 \text{ microfarads}) = 21.3 \text{ nanoamperes}$$

Generated leakage current I leak:

$$I\text{leak} = (50 + 82.5 + 161.7 + 21.3) \text{ nanoamperes} = 315.5 \text{ nanoamperes}$$

When the line period is 212 microseconds, and the clamp period is 0.7 microsecond (the same as the clamp period within the black reference pixel period of the conventional technology), the error (deviation) ΔV of the offset voltage obtained as a result of the above generation becomes:

$$\Delta V = (\text{line period/clamp period}) \times \text{leakage current} \times$$
$$\text{clamp switch ON resistance}$$
$$= (212 \text{ microseconds}/0.7 \text{ mega microsound}) \times$$
$$315.5 \text{ nanoamperes} \times 297.5 \text{ ohms}$$
$$= 28.4 \text{ millivolts}$$

When the adjustment range due to the black offset correction circuit 54 is taken to be ±100 millivolts, the black offset correction circuit 54 performs correction by applying feedback from the output of the A/D converter circuit 53. An offset voltage of 28.4 millivolts is therefore amplified by the gain of the amplifier circuit 52.

Therefore, 100/28.4=3.5. When an offset voltage of 28.4 millivolts then occurs, when a gain of 3.5 times or more is applied by the amplifier circuit, then deviation from the adjustment range of the black offset correction circuit occurs.

This is because, taking into consideration the actual sensitivity of the CCD, in addition to the permissible gain being too small at 3.5 times, the whole of the correction range of the black offset correction circuit is not used in correction of offset deviation resulting from the leakage current, but is also used for correction of offset due to waveform deterioration etc. The presents problems with regards to practical use.

When the pixel frequency is increased by 5% to 37.15 megahertz so that one line period becomes 212 microseconds, the number of pixels for one line becomes:

$$212/(1/37.15)=7875 \text{ pixels}$$

It is also possible to have:

$$7875-7500=375 \text{ pixels}$$

dummy pixels in addition to the 7500 pixel portion that are the black reference pixels and valid pixels combined.

When the dummy pixel periods are all made to be a clamp period, the effective clamp period is taken to be ½ of the dummy pixel period, and the pixel frequency is 37.15 megahertz. The valid clamp period then becomes:

$$(1/37.15) \times 375 \times 0.5 = 5.05 \text{ microseconds}$$

As a result, deviation in offset voltage that occurs is reduced to:

$$\Delta V = (212 \text{ microseconds}/5.05 \text{ microseconds}) \times$$
$$315.5 \text{ microamperes} \times 297.5 \text{ ohms}$$
$$= 3.9 \text{ millivolts}$$

The adjustment range of the black offset correction circuit 54 is ±100 millivolts. The gain of the amplifier circuit 52 can therefore be up to:

$$100/3.9=25.6$$

Therefore, even if a gain exceeding ten times is applied by the amplifier circuit 52, this will be within the adjustment range of the black offset correction circuit 54.

The error (deviation) $\Delta V$ for the leakage current and offset voltage can be calculated under the following conditions:
a.c.—coupling capacitors: 2.2 microfarads
Clamp switch on resistance: 100 ohms
Power supply voltage: 3.3 volts
Clamp potential: 1.5 volts
CCD output offset (a.c.—coupling input): 6.5 volts
Leakage between electrodes of board: 100 MOhms/mm
a.c.—coupling capacitor leakage: 500 MOhms/μF
Pin pitch of analog signal processing circuit (IC): 0.1 millimeter
Correction range of black offset correction circuit: ±300 millivolts
Gain range of analog signal processing circuit (IC): 1 to 20 times Neighboring pins for input pins of analog signal processing circuit (IC):
Neighboring pin 1: Clamp potential
Neighboring pin 2: Clamp potential
Internal leakage of analog signal processing circuit (IC): 50 nanoamperes
Inter-pin leakage of analog signal processing circuit (IC):

$$(1.5 \text{ volts}-1.5 \text{ volts})/100 \text{ M}\Omega/\text{mm} \times 0.1 \text{ millimeter} = 0 \text{ nanoampere}$$

Leakage current between pads of the a.c.—coupling capacitors (chip capacitors):

$$(6.5 \text{ volts}-1.5 \text{ volts})/(100 \text{ M}\Omega/\text{mm} \times 0.3 \text{ millimeter}) = 166.7 \text{ nanoamperes}$$

Leakage current between electrodes of a.c.—coupling capacitors:

$$(6.5 \text{ volts}-1.5 \text{ volts})/(500 \text{ M}\Omega \cdot \mu F/ 2.2 \text{ microfarads}) = 22.0 \text{ nanoamperes}$$

Generated leakage current I leak:

$$I\text{leak}=(50+0+166.7+22.0) \text{ nanoamperes}=238.7 \text{ nanoamperes}$$

When the pixel frequency is increased by 1% to 35.73 megahertz so that one line period becomes 212 microseconds, the number of pixels for one line becomes:

$$212/(1/35.73)=7575 \text{ pixels}$$

The 75 dummy pixels can then be obtained from the 7575 pixels by combining the black reference pixels and the valid pixels and subtracting 7500 pixels.

$$7575-7500=75 \text{ pixels}$$

When the dummy pixel periods are all made to be a clamp period, the effective clamp period is taken to be ½ of the dummy pixel period, and the valid clamp period then becomes:

$$1/35.73 \times 75 \times 0.5 = 1.05 \text{ microseconds}$$

As a result, deviation $\Delta V$ in offset voltage that occurs is reduced to:

$$\Delta V = (212 \text{ microseconds}/1.05 \text{ microseconds}) \times$$
$$238.7 \text{ nanoamperes} \times 100 \text{ ohms}$$
$$= 5.3 \text{ millivolts}$$

The adjustment range of the black offset correction circuit 54 is ±300 millivolts. The gain of the amplifier circuit 52 can therefore be up to:

$$300/5.3=56.6$$

Therefore, even if a gain exceeding twenty times is applied by the amplifier circuit 52, this will be within the adjustment range of the black offset correction circuit 54.

As in the case of other conditions, this becomes 100/5.3=18.9 even if the adjustment range of the black offset correction circuit 54 is ±100 millivolts. Therefore, even if a gain exceeding ten times is applied by the amplifier circuit 52, this will be within the adjustment range of the black offset correction circuit 54.

An explanation is given of a modification of the present invention applied to a color image reading device. The present invention can also, however, be similarly applied to a monochromatic image reading device of an example in the conventional technology shown in FIGS. 14 and 15.

Figure 15:
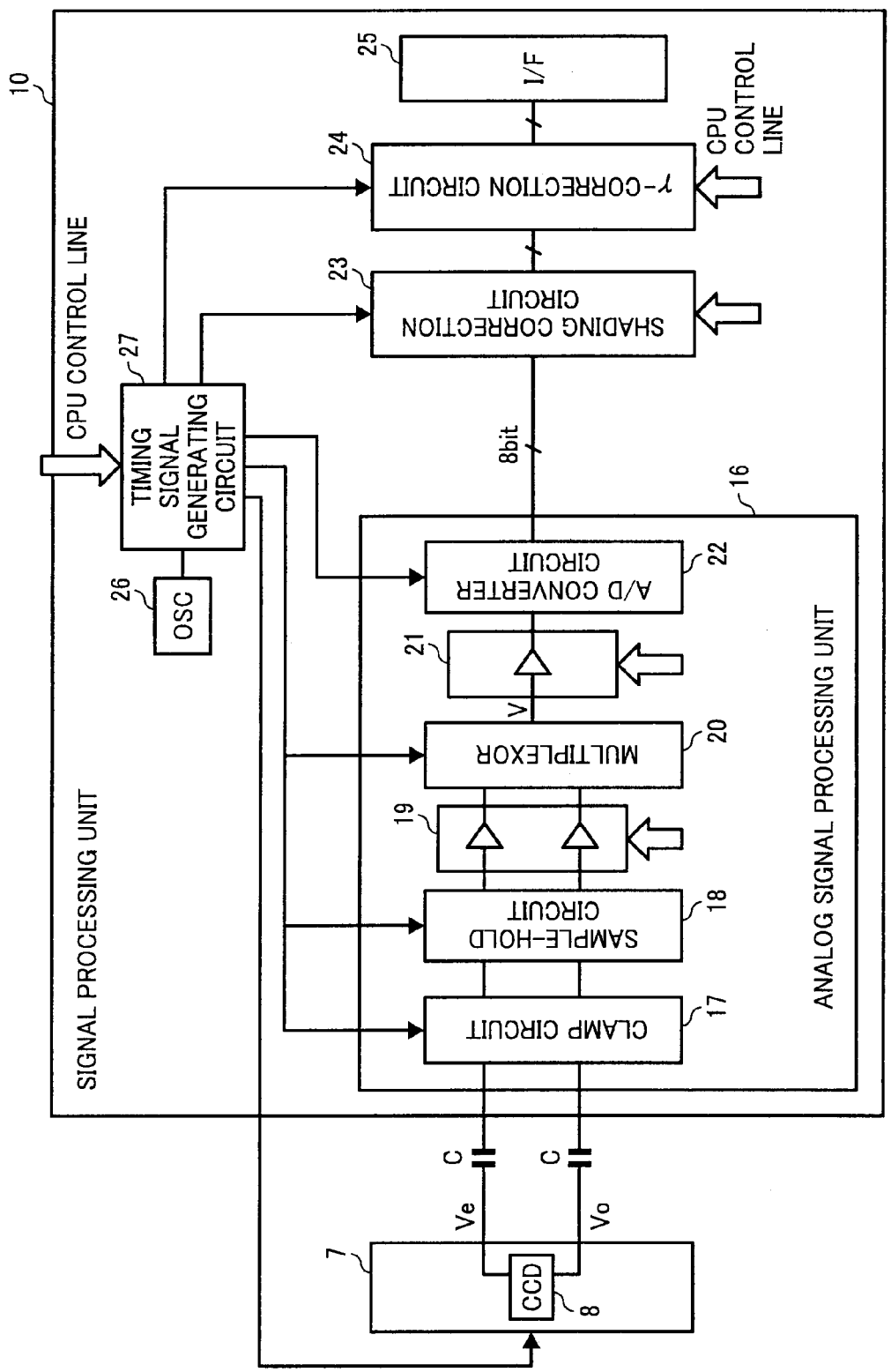
FIG. 15 is a block diagram of a signal processing unit shown in FIG. 14.
Figure 16:
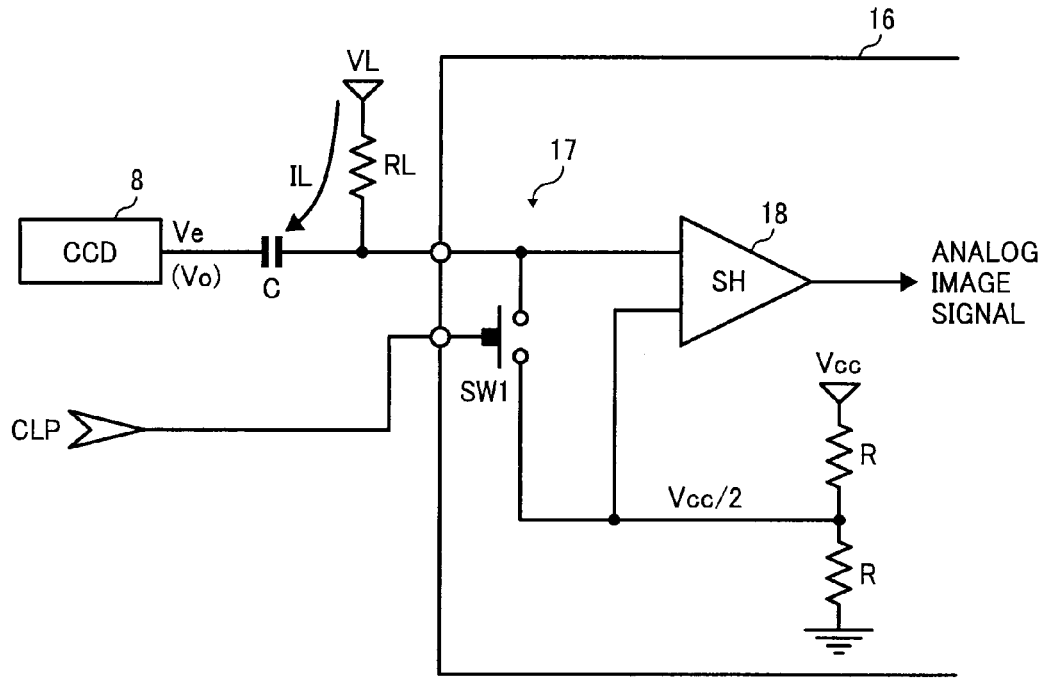
FIG. 16 is a circuit diagram of a clamp switch of a clamp circuit shown in FIG. 15 in an OFF state.
Figure 17:
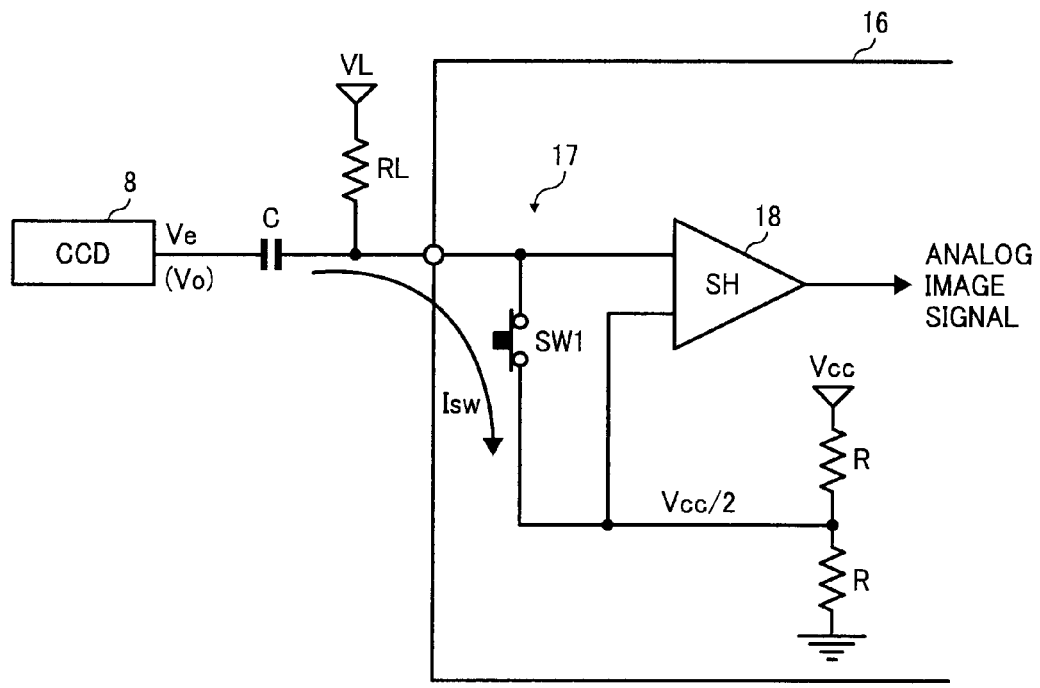
FIG. 17 is a circuit diagram of the clamp switch of the clamp circuit shown in FIG. 15 in an ON state.

In this case, a one line CCD linear image sensor is used as the photoelectric element and the circuit from the analog signal processing circuit 31 to the interface 35 can all be one system. It is, however, also possible for the CCD linear image sensor to be as shown in FIG. 15, with analog image signals being divided into odd numbered pixels and even numbered pixels for each line, which are then subjected to clamp processing individually using analog signal processing circuits, and synthesized after going through a sample-hold process and being amplified.

It is also possible, even with color image reading devices using three-line CCDs as in the above embodiment, for the three-line CCD to divide the analog image signals for each color up into analog image signals for odd numbered pixels and even numbered pixels. The analog image signals can then be subjected to clamp processing individually at respective analog signal processing circuits, subjected to a sample-hold process and amplified, and then synthesized for each color. In this event, the analog signal processing circuit requires six systems for the clamp circuit, the sample-hold circuit, and the amplifier circuit. A multiplex circuit that synthesizes analog image signals for odd numbered pixels and even numbered pixels for each color is then required.

Figure 13:
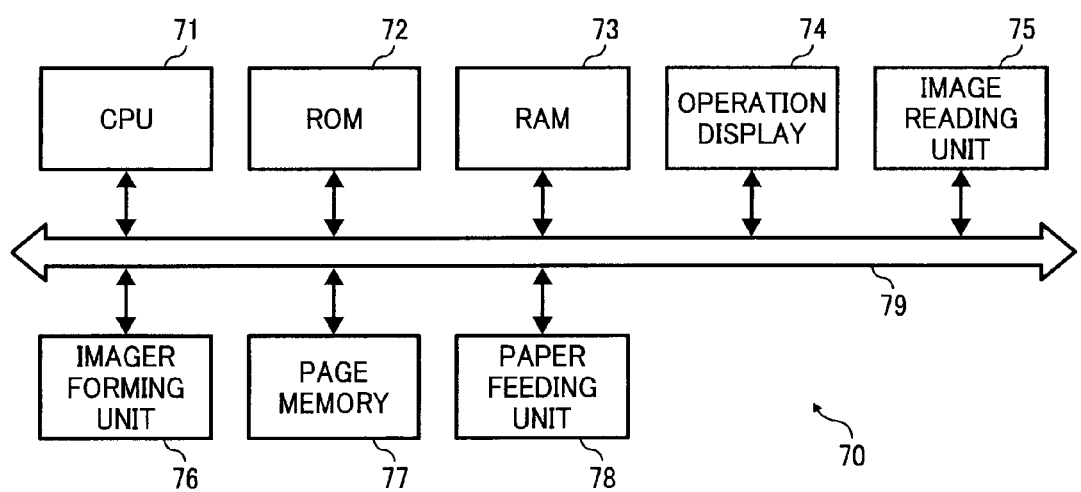
FIG. 13 is a block diagram of an image forming device according to the embodiment.

FIG. 13 is a block diagram of an image forming device 70 according to the embodiment.

The image forming device 70 has original document reading functions such as a copier and multi-function product and an image forming function. The image forming device 70 includes a CPU 71 that controls the whole of this device, a read only memory (ROM) 72 that stores therein an operation program for the CPU 71, a random access memory (RAM) 73 that stores therein various data relating to operations of the device and is also a working memory for the CPU 71, and a bus 79 connecting the CPU 71, the ROM 72 and the RAM 73, and can be made from a microcomputer.

The image forming device 70 also includes an operation display 74, an image reading unit 75, an image forming unit 76, a page memory 77, and a paper feeding unit 78 that are also connected both together and to the CPU 71 via the bus 79.

The operation display 74 includes a display such as an liquid crystal display (LCD) for displaying information such as the operating state of the device, and input devices such as a keyboard (including a touch panel) for the operator to carry out various input operations.

The image reading unit 75 corresponds to the image reading device capable of reading out color images of the present invention. The image reading unit 75 reads out images for an original document broken down into colors of R, G, and B and outputs digital image signals for each color. The digital image signals for each color are then stored in page units in respective page memories 77 under the control of the CPU 71.

The image forming unit 76 is a color plotter such as a laser printer or ink jet printer that overlays and color prints image data for each color stored in the page memory 77 on recording paper. The paper feeding unit 78 is a device for feeding recording paper into the image forming unit 76 and includes a paper feed tray, a paper feed roller, and a transport mechanism.

The image forming device 70 uses the image reading device of the present invention in the image reading unit 75. It is therefore possible to reduce the start-up time from the power supply being turned ON until image reading is possible (in the case of a copier, the time until copying is possible).

The image forming device can be a digital copier, facsimile device, or a digital multifunction product combining these functions together with functions such as a printer.

If the monochrome image reading device of the present invention is adopted as the image reading unit 75 and the image forming unit 76 is a monochromatic image forming units that print monochromatic images on recording paper using outputted digital image data, it is possible to implement a monochromatic image forming device where the start up time is short.

According to an aspect of the present invention, the image reading device and the image forming device are capable of ensuring that the ratio of the main scanning line period and the clamp period does not change to a great extent even when the main scanning line period is switched as a result of switching of the reading mode (reading speed). Therefore, substantial deviation in the offset potential of the analog image signal hardly occurs, and stable image reading is possible directly after switching the line period.

Furthermore, according to another aspect of the present invention, it is possible to make the time for the offset potential to stabilize directly after switching of the main scanning line period short by broadening the clamp period of the clamp unit to a valid pixel region of the main scanning line period directly after switching of the main scanning line period. Therefore, it is possible to start reading after read mode switching more rapidly.

If the opening and closing state of an original document pressing member is monitored and the clamp period is lengthened only when the original document pressing member is closed when the main scanning line period is switched over, it is possible to make the time from directly after switching of the main scanning line period until a readable state short by lengthening the clamp period in a state where exposure to extraneous light does not take place.

Moreover, according to still another aspect of the present invention, if, after continuing to carry out black offset level correction and white level correction in the same main scanning line period of a number of main scanning line periods where switching is possible, the main scanning line period is switched over sequentially and correction of the black offset level and correction of the white level is continued in a further same main scanning line period, the number of times of switching of the main scanning line period at the time of adjustment before starting the reading operation is reduced, and the number of times of waiting until the offset voltage stabilizes during switching of the main scanning line period is reduced. Therefore, it is possible to shorten the time taken for the device to start up.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   an exposing unit that exposes an original document to light;
   a photoelectric converting unit that converts an intensity of light reflected from the original document exposed to light by the exposing unit into an electrical signal, and outputs an analog image signal in a main scanning line period;
   a clamp unit that inputs an alternating-current-coupled analog image signal outputted by the photoelectric converting unit, and matches an offset potential of the analog image signal with a predetermined clamp potential;
   a processing unit that performs analog processing of the analog image signal that has passed through the clamp unit;

a signal converting unit that converts the analog image signal subjected to analog processing by the processing unit into a digital image signal;

a switching unit that switches the main scanning line period, and outputs analog image signals to the photoelectric converting unit at a plurality of reading speeds; and a changing unit that changes a clamp period of the clamp unit depending on the main scanning line period after switching by the switching unit.

2. The image reading device according to claim 1, wherein the changing unit changes the clamp period of the clamp unit so that a ratio of the main scanning line period and the clamp period does not change before and after switching of the main scanning line period by the switching unit.

3. The image reading device according to claim 1, wherein the changing unit extends the clamp period of the clamp unit as far as a valid pixel region of the main scanning line period directly after switching of the main scanning line period by the switching unit until the clamp potential stabilizes.

4. The image reading device according to claim 3, further comprising:

a pressing unit that can be opened and closed that presses on the original document exposed to light by the exposing unit; and a sensor that detects whether the pressing unit is opened or closed, wherein the changing unit extends the clamp period of the clamp unit as far as a valid pixel region of the main scanning line period when the sensor detects that the pressing member is closed when the main scanning period is switched.

5. The image reading device according to claim 1, wherein the photoelectric converting unit is a charge-coupled device linear line sensor.

6. The image reading device according to claim 1, wherein the photoelectric converting unit is a three line charge-coupled device color linear line sensor.

7. The image reading device according to claim 1, further comprising a digital image processing unit that performs digital imaging processing of a digital image signal converted by the signal converting unit.

8. An image forming device comprising:

an image reading unit of the image reading device according to claim 1; and an image forming unit that prints digital image data outputted by the image reading unit on a recording medium.

9. An image reading device comprising:

an exposing unit that exposes an original document to light;

a photoelectric converting unit that converts an intensity of light reflected from the original document exposed to light by the exposing unit into an electrical signal and outputs an analog image signal in a main scanning line period;

a clamp unit that inputs an alternating-current-coupled analog image signal outputted by the photoelectric converting unit and matches an offset potential of the analog image signal with a predetermined clamp potential;

a processing unit that performs analog processing of the analog image signal that has passed through the clamp unit;

a signal converting unit that converts the analog image signal subjected to analog processing by the processing unit into a digital image signal;

a switching unit that switches the main scanning line period and outputs the analog image signal to the photoelectric converting unit at a plurality of reading speeds;

a black correcting unit that corrects the black offset level of the analog image signal;

a white correcting unit that corrects the white level of the analog image signal; and a control unit that controls the switching unit, the black correcting unit, and the white correcting unit so that after continuing to carry out black offset level correction and white level correction using the same main scanning line period, of a plurality of main scanning line periods capable of being switched by the switching unit, the main scanning line period is switched sequentially, and correction of the black offset level and the white level are continued using an identical main scanning line period.

10. The image reading device according to claim 9, wherein the photoelectric converting unit is a charge-coupled device linear line sensor.

11. The image reading device according to claim 9, wherein the photoelectric converting unit is a three line charge-coupled device color linear line sensor.

12. The image reading device according to claim 9, further comprising a digital image processing unit that performs digital image processing of a digital image signal converted by the signal converting unit.

13. An image forming device comprising:

an image reading unit of the image reading device according to claim 9; and an image forming unit that prints digital image data outputted by the image reading unit on recording medium.

14. An image reading device comprising:

an exposing unit that exposes an original document to light;

a photoelectric converting unit that converts an intensity of light reflected from the original document exposed to light by the exposing unit into an electrical signal and outputs an analog image signal in a main scanning line period;

a clamp unit that inputs an alternating-current-coupled analog image signal outputted by the photoelectric converting unit, and matches an offset potential of the analog image signal with a predetermined clamp potential;

a processing unit that performs analog processing of the analog image signal that has passed through the clamp unit;

a signal converting unit that converts the analog image signal subjected to analog processing by the processing unit into a digital image signal;

a switching unit that switches the main scanning line period, and outputs the analog image signal to the photoelectric converting unit at a plurality of reading speeds; and an extending unit that extends a clamp period of the clamp unit as far as a valid pixel region of the main scanning line period directly after switching of the main scanning line period by the switching unit.

15. The image reading device according to claim 14, further comprising:

a pressing unit that can be opened and closed that presses on the original document exposed to light by the exposing unit; and a sensor that detects whether the pressing unit is opened or closed, wherein the extending unit extends the clamp period of the clamp unit as far as a valid pixel region of the main scanning line period only when the sensor detects that the pressing unit is closed.

16. The image reading device according to claim 14, wherein the photoelectric converting unit is a charge-coupled device linear line sensor.

17. The image reading device according to claim 14, wherein the photoelectric converting unit is a three line charge-coupled device color linear line sensor.

18. The image reading device according to claim 14, further comprising a digital image processing unit that performs digital image processing of a digital image signal converted by the signal converting unit.

19. An image forming device comprising:
   an image reading unit of the image reading device according to claim 14; and
   an image forming unit that prints digital image data outputted by the image reading unit on a recording medium.

* * * * *